United States Patent
Rao et al.

(10) Patent No.: US 11,195,046 B2
(45) Date of Patent: Dec. 7, 2021

(54) METHOD AND SYSTEM FOR IMAGE SEARCH AND CROPPING

(71) Applicants: Varshanth Ravindra Rao, Waterloo (CA); Uzair Ahmad, Markham (CA); Peng Dai, Markham (CA); Juwei Lu, North York (CA); Wei Li, Markham (CA); Jianpeng Xu, Markham (CA)

(72) Inventors: Varshanth Ravindra Rao, Waterloo (CA); Uzair Ahmad, Markham (CA); Peng Dai, Markham (CA); Juwei Lu, North York (CA); Wei Li, Markham (CA); Jianpeng Xu, Markham (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 214 days.

(21) Appl. No.: 16/441,918

(22) Filed: Jun. 14, 2019

(65) Prior Publication Data
US 2020/0394434 A1 Dec. 17, 2020

(51) Int. Cl.
*G06K 9/46* (2006.01)
*G06K 9/40* (2006.01)
*G06F 16/538* (2019.01)
*G06N 20/00* (2019.01)
*G06T 3/40* (2006.01)

(52) U.S. Cl.
CPC ......... *G06K 9/4671* (2013.01); *G06F 16/538* (2019.01); *G06K 9/40* (2013.01); *G06N 20/00* (2019.01); *G06T 3/40* (2013.01)

(58) Field of Classification Search
CPC ...... G06K 9/4971; G06K 9/40; G06F 16/538; G06N 20/00; G06T 3/40
See application file for complete search history.

(56) References Cited

U.S. PATENT DOCUMENTS

| 5,978,519 A | 11/1999 | Bollman et al. |
| 6,654,506 B1 | 11/2003 | Luo et al. |
| 7,519,236 B2 | 4/2009 | Cheng et al. |

(Continued)

FOREIGN PATENT DOCUMENTS

CN 105100579 A 11/2015

OTHER PUBLICATIONS

Connecting Language and Vision Using Crowdsourced Dense Image Annotations, Krishna, R., Zhu, Y., Groth, O. et al. Int J Comput Vis (2017) 123: 32. https://doi.org/10.1007/s11263-016-0981-7 2017.

(Continued)

*Primary Examiner* — Kevin Ky

(57) ABSTRACT

Methods and systems for processing an image are described. A saliency map is generated from the image. The saliency map indicates one or more salient portions of the image that have saliency values satisfying a saliency criterion. A scene graph is generated for at least the one or more salient portions. The scene graph represents a plurality of objects detected in the image. The scene graph further represents one or more relationships between each respective object pairs. One or more dataset entries associated with the image are generated. Each of the one or more relationships for each of the one or more object pairs is indicated by a respective dataset entry. The one or more dataset entries are stored in a first dataset.

20 Claims, 12 Drawing Sheets

(56) References Cited

U.S. PATENT DOCUMENTS

| | | | |
|---|---|---|---|
| 8,860,756 B2 | 10/2014 | Boreham et al. | |
| 9,070,182 B1 | 6/2015 | Chua et al. | |
| 9,626,584 B2 | 4/2017 | Lin et al. | |
| 10,789,288 B1* | 9/2020 | Ranzinger | G06F 16/24578 |
| 10,846,552 B1* | 11/2020 | Wu | G06F 16/583 |
| 2002/0107973 A1* | 8/2002 | Lennon | G06F 16/9577 |
| | | | 709/231 |
| 2002/0152267 A1* | 10/2002 | Lennon | G06F 16/40 |
| | | | 709/203 |
| 2003/0018607 A1* | 1/2003 | Lennon | G06F 16/40 |
| 2007/0201765 A1 | 8/2007 | DuBois | |
| 2010/0114860 A1* | 5/2010 | Choi | G06F 16/9566 |
| | | | 707/709 |
| 2011/0208716 A1 | 8/2011 | Liu et al. | |
| 2013/0318582 A1* | 11/2013 | McCann | G06F 21/41 |
| | | | 726/7 |
| 2014/0164927 A1* | 6/2014 | Salaverry | G06K 9/00442 |
| | | | 715/727 |
| 2014/0372408 A1* | 12/2014 | Chishiro | G06F 16/211 |
| | | | 707/715 |
| 2016/0342863 A1* | 11/2016 | Kwon | G06F 16/51 |
| 2017/0177978 A1* | 6/2017 | Narasimha | G06K 9/4652 |
| 2020/0034976 A1* | 1/2020 | Stone | G06N 3/084 |
| 2020/0159647 A1* | 5/2020 | Puszkiewcz | G06K 9/6256 |

OTHER PUBLICATIONS

Factorizable Net: An Efficient Subgraph-based Framework for Scene Graph Generation, Yikang Li et al., ECCV 2018 2018.

* cited by examiner

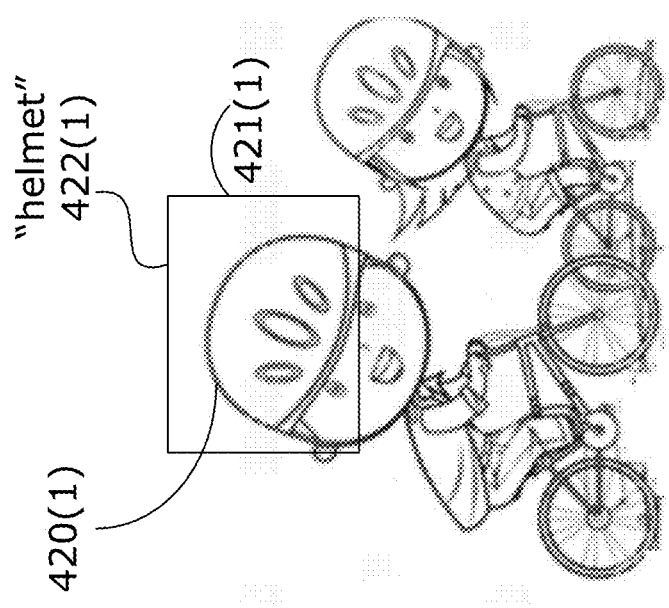

| No. | Image | Triplet |
|---|---|---|
| 418(1) | 411(1) | <boy, ride, bike> 433(1) |
| 418(2) | 411(1) | <girl, ride, bike> 433(2) |
| ... | ... | ... |
| 418(n) | 411(1) | ... |

| No. | Image | Bounding box | Location parameters | | | |
|---|---|---|---|---|---|---|
| 418(1) | 411(1) | 421(1) | (x1,y1) | (x2,y2) | (x3,y3) | (x4,y4) |
| | | 421(n) | (x1',y1') | (x2',y2') | (x3',y3') | (x4',y4') |
| 418(2) | 411(1) | 421(1a) | (x1a,y1a) | (x2a,y2a) | (x3a,y3a) | (x4a,y4a) |
| | | 421(na) | (x1a',y1a') | (x2a',y2a') | (x3a',y3a') | (x4a',y4a') |
| 418(n) | 411(1) | 421(1b) | (x1b,y1b) | (x2b,y2b) | (x3b,y3b) | (x4b,y4b) |
| 418(n') | 411(n) | 421(1'') | (x1'',y1'') | (x2'',y2'') | (x3'',y3'') | (x4'',y4'') |

FIG. 4G

METHOD AND SYSTEM FOR IMAGE SEARCH AND CROPPING

TECHNICAL FIELD

The present disclosure relates to image processing, in particular methods and systems for performing image search and image cropping.

BACKGROUND

In the computer vison domain, image cropping is commonly used in various applications (e.g., digital photographing, digital image editing, etc.) to select a sub-region of a given image that is visually more pleasing than the given image as a whole.

Conventional image cropping has been typically implemented based on detection of faces in images or in accordance with an area of interest defined by a user in a specific image. However, such image cropping methods may be inefficient and may require manual input.

Moreover, as the number of images stored in a repository (e.g., online or offline) is growing, conventional methods for searching for an image having specific visual contents stored in the repository may not be satisfactory. For example, searching a repository storing a large number of images manually may be time-consuming, Conventional search algorithms based on a query criterion may be inaccurate and computationally expensive.

Accordingly, it would be desirable to provide a solution for generating cropped images from a repository storing images, based on a query criterion.

SUMMARY

The present disclosure provides methods and systems for generating a dataset for an image. The dataset includes dataset entries indicating one or more relationships between object pairs for one or more salient portions of the image. Information from the dataset may help to provide greater accuracy for image search and to provide greater effectiveness for image cropping. Methods disclosed herein may help to lower the complexity cost to generate a scene graph representing the object relationships in the image. In some examples, the methods and systems of the present disclosure may be used in various different applications, such as in image searching and image management applications, among other possibilities. Examples of the disclosed methods of generating a simplified scene graph for an image may help to improve image search accuracy and may enable each cropped image to be more visually pleasing, without requiring significant manual input.

In some example aspects, the present disclosure describes a method for processing an image. The method includes: receiving an image, generating a saliency map from the image, wherein the saliency map indicates one or more salient portions of the image that have saliency values satisfying a saliency criterion; generating a scene graph for at least the one or more salient portions, the scene graph representing a plurality of objects detected in the image, one or more object pairs being formed by the plurality of objects, and the scene graph further representing one or more relationships between each respective object pairs; generating one or more dataset entries associated with the image, wherein each of the one or more relationships for each of the one or more object pairs is indicated by a respective dataset entry; and storing the one or more dataset entries in a first dataset.

In some examples, the one or more dataset entries stored in the first dataset may include dataset entries associated with different respective images.

In some examples, the method also includes: searching the first dataset to identify a dataset entry that satisfies a query criterion; selecting the image associated with the identified dataset entry; cropping the selected image according to the object pair indicated by the identified dataset entry; and outputting the cropped image.

In some examples, the cropping may further include: applying one or more rules to the selected image to determine corresponding aesthetic regions of the selected image; and further cropping the selected image according to the determined corresponding aesthetic regions.

In some examples, generating the scene graph may include: detecting the plurality of objects within the image; identifying the one or more object pairs formed by the detected objects; and performing relationship extraction between each respective object pair within the salient portions of the image indicated by the saliency map.

In some examples, detecting the plurality of objects may further include: performing object localization for each detected object to generate a bounding box of the detected object; for each respective bounding box: generating corresponding location parameters of the respective bounding box; and storing an identifier of the respective bounding box and the location parameters in a second dataset.

In some examples, generating the scene graph may include: generating one or more proposed regions of the image using a region proposal network (RPN); detecting the plurality of objects in the one or more proposed regions; identifying the one or more object pairs formed by the detected objects; and performing relationship extraction between each respective object pair within the salient portions of the image indicated by the saliency map.

In some examples, the method may further include: searching the first dataset to identify one or more dataset entries that satisfy a query criterion; searching the second dataset to identify one or more location parameters that satisfy the one or more dataset entries; and cropping the image according to the one or more identified location parameters.

In some examples, cropping may include: combining respective bounding boxes corresponding to the one or more identified location parameters to generate a union box; cropping the image around the union box; and outputting the cropped image.

In some example aspects, the present disclosure describes a method for processing at least one image. The method includes: receiving a query criterion, searching a first dataset comprising one or more dataset entries, to identify a dataset entry that satisfies the query criterion, the identified dataset entry being associated with an image, the identified dataset entry indicating a relationship for an object pair which is formed by a pair of objects detected in the image, the objects and the relationship being represented by a scene graph; selecting the image associated with the identified dataset entry; cropping the selected image according to respective the object pair indicated by the identified dataset entry; and outputting the cropped image.

In some examples, the cropping may include: applying the one or more rules to the selected image to determine corresponding aesthetic regions of the selected image; and cropping the selected image according to the determined corresponding aesthetic regions.

In some examples, the method may further include: outputting the cropped image.

In some examples, the method may further include: receiving at least one image. The dataset may be generated by: for each received image, generating a saliency map for the received image, wherein the saliency map indicates one or more salient portions of the image that have saliency values satisfying a saliency criterion; generating a respective scene graph for at least the one or more salient portions of the received image; generating the one or more dataset entries associated with the received image; and storing the respective one or more dataset entries associated with the received image in the first dataset.

In some examples, for the received image, generating the scene graph may include: generating one or more proposed regions of the image using a region proposal network (RPN); detecting the plurality of objects in the one or more proposed regions; identifying the one or more object pairs formed by the detected objects; and performing relationship extraction between each respective object pair within the salient portions of the image indicated by the saliency map.

In some examples, detecting the plurality of objects may further include: performing object localization for each detected object to generate a bounding box of the detected object; for each bounding box, generating a corresponding location parameter of the respective bounding box; and storing respective location parameters in a second dataset.

In some example aspects, the present disclosure describes a system including: a memory storing instructions; and a processor coupled to the memory. The processor is configured to execute the instructions to: generate a saliency map for an image, wherein the saliency map indicates one or more salient portions of the image that have saliency values satisfying a saliency criterion; generate a scene graph for at least the one or more salient portions, the scene graph representing a plurality of objects detected in the image, one or more object pairs being formed by the plurality of objects, and the scene graph further representing one or more relationships between each respective object pairs; generate one or more dataset entries associated with the image, wherein each of the one or more relationships for each of the one or more object pairs is indicated by a respective dataset entry; and store the one or more dataset entries in a first dataset.

In some examples, the one or more dataset entries stored in the first dataset may include dataset entries associated with different respective images.

In some examples, the processor may be further configured to execute the instructions to: search the first dataset to identify a dataset entry that satisfies a query criterion; select the image associated with the identified dataset entry; crop the selected image according to the object pair indicated by the identified dataset entry; and output the cropped image.

In some example aspects, the present disclosure describes a system for processing at least one image. The system includes: a memory storing instructions; and a processor coupled to the memory. The processor is configured to execute the instructions to: receive a query criterion; search a dataset to identify a dataset entry that satisfies the query criterion, the identified dataset entry being associated with an image, the identified dataset entry indicating a relationship for an object pair which is formed by a pair of objects detected in the image, the objects and the relationship being represented by a scene graph; select the image associated with the identified dataset entry; crop the selected image according to the object pairs indicated by the identified dataset entry; and output the cropped image.

In some examples, the processor may be further configured to execute the instructions to perform the cropping by: applying one or more rules to the selected image to determine corresponding aesthetic regions of the selected image; and cropping the selected image according to the determined corresponding aesthetic regions.

BRIEF DESCRIPTION OF THE DRAWINGS

FIG. 4D is a block diagram of example bounding boxes generated by the system of FIG. 4C.

FIG. 4F is a block diagram of an example first dataset generated by the dataset generator of the system of FIG. 4B.

FIG. 4G is a block diagram of an example second dataset generated by the dataset generator of the system of FIG. 4B.

Similar reference numerals may have been used in different figures to denote similar components.

DESCRIPTION OF EXAMPLE EMBODIMENTS

The present disclosure is made with reference to the accompanying drawings, in which embodiments are shown. However, many different embodiments may be used, and thus the description should not be construed as limited to the embodiments set forth herein. Rather, these embodiments are provided so that this disclosure will be thorough and complete. Like numbers refer to like elements throughout. Separate boxes or illustrated separation of functional elements or modules of illustrated systems and devices does not necessarily require physical separation of such functions or modules, as communication between such elements can occur by way of messaging, function calls, shared memory space, and so on, without any such physical separation. As such, functions or modules need not be implemented in physically or logically separated platforms, although they are illustrated separately for ease of explanation herein. Different devices can have different designs, such that while some devices implement some functions in fixed function hardware, other devices can implement such functions in a programmable processor with code obtained from a machine readable medium.

Figure 1:
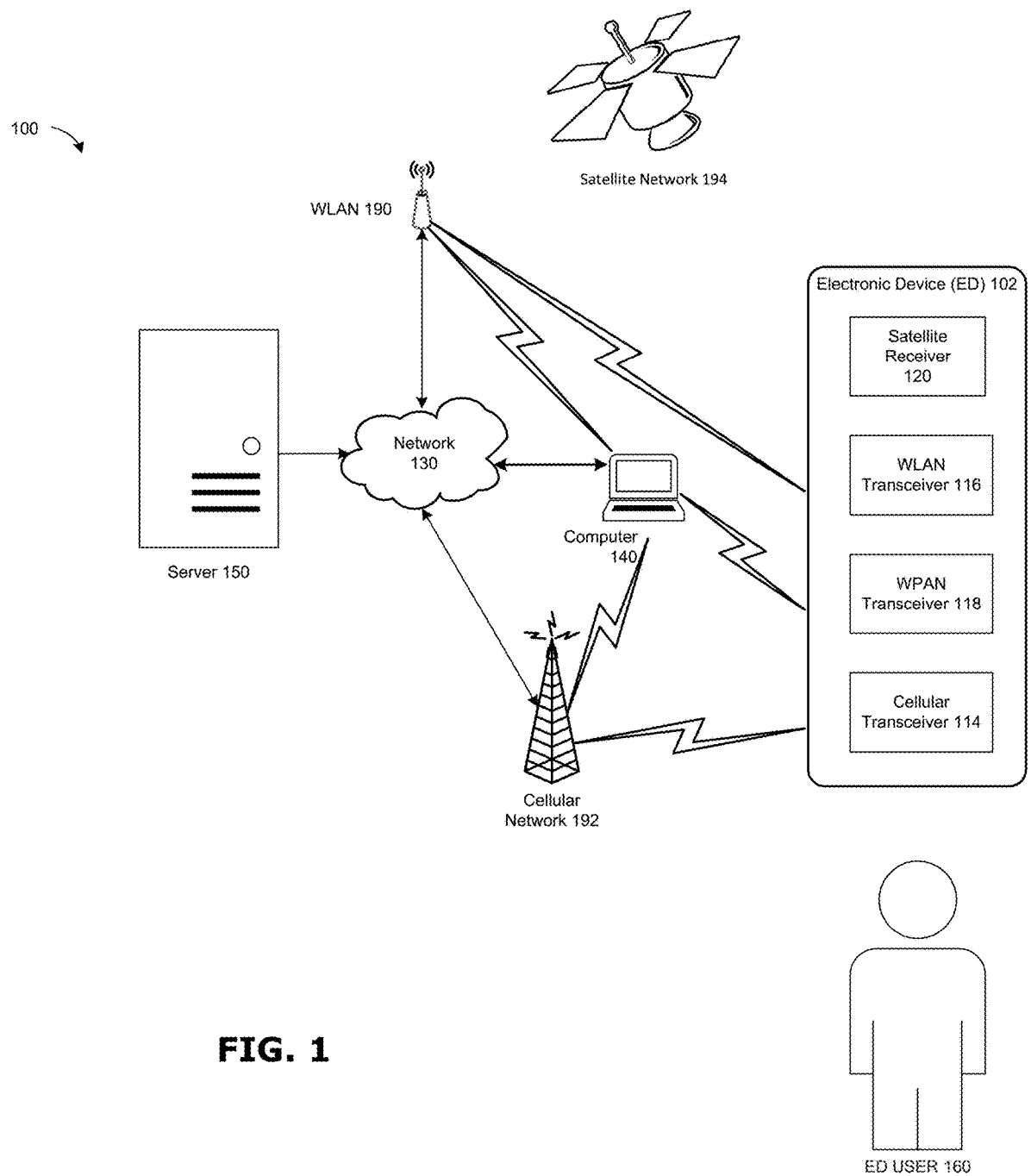
FIG. 1 is a block diagram illustrating a communication system suitable for use with an electronic device (ED) in accordance with an example embodiment.

FIG. 1 is a schematic diagram illustrating an example communication system 100 suitable for operating an electronic device (ED) 102 in accordance with examples of the present disclosure. As described in greater detail below, communication system 100 can include multiple different types of communication networks in communication with the ED 102 and each of these communication networks can each be connected directly or indirectly to a further common network 130 such as the Internet, enabling the ED 102 to access one or more services through the network 130. In some applications, the service(s) may be stored within a server 150, which is also referred to as a content source.

In example embodiments, ED 102 is associated with at least one subscriber or a primary user 160 who owns, has been assigned, or is otherwise associated with ED 102.

The ED 102 in this example comprises a satellite receiver 120 for receiving satellite signals from a satellite network 194 that comprises a plurality of satellites that are part of a global or regional satellite navigation system. In some embodiments, a satellite transceiver capable of both receiving and sending satellite signals may be provided instead of a satellite receiver that can only receive satellite signals.

The ED 102 can use signals received by the satellite receiver 120 from a plurality of satellites in the satellite network 194 to determine its position. In at least some embodiments, the satellite network 194 comprises a plurality of satellites that are part of at least one Global Navigation Satellite System (GNSS) that provides autonomous geospatial positioning with global coverage. For example, the satellite network 194 may be a constellation of GNSS satellites. Example GNSSs include the United States NAVSTAR Global Positioning System (GPS) or China's BeiDou Navigation Satellite System (BDS), among others.

The ED 102 also comprises one or more wireless transceivers for exchanging at least data communications. The wireless transceivers comprises at least a cellular (RF) transceiver 114 for communicating with a plurality of different radio access networks (RAN) such as a cellular network 192. The wireless transceivers may also comprise a wireless local area network (WLAN) transceiver 116 for communicating with a WLAN 190 via a WLAN access point (AP). The WLAN 190 may comprise a Wi-Fi wireless network which conforms to IEEE 802.11x standards (sometimes referred to as Wi-Fi®). Other communication protocols may be used for the WLAN 190 in other embodiments.

The wireless transceivers may also comprise a wireless personal area network (WPAN) transceiver 118, such as a short range wireless or Bluetooth® transceiver, for communicating with a computer 140 or other Bluetooth® enabled devices such an activity tracker or smartphone. The ED 102 may alternatively communicate with the computer 140 or other user devices using a physical link such as a data port (e.g., USB port). The wireless transceivers can also include a Near field communication (NFC) transceiver.

In the illustrated embodiment, the server 150 may wirelessly interface with the ED 102 directly or indirectly to communicate with each other through communications network 130. In some examples, one or more of the functions described below in respect of the server 150 could be performed at the ED 102 and vice versa, such as applying various machine-learning algorithms. In some examples, data stored at the server 150 may be stored additionally or alternatively at the ED 102. For example, some resources or data libraries (e.g., image libraries, albums, image repositories or video libraries) may be stored at the server 150, and the ED 102 may access the resources or data libraries stored at the server 150 via the network 130. In other examples, the data libraries may be stored at the ED 102, such as in one or more non-transitory memories of the ED 102, and the ED 102 may access the resources or data libraries on the non-transitory memories.

The ED 102 may be any component (or collection of components) capable of querying for images and communicating with the server 150. For example, the ED 102 could be a mobile or stationary device such as a smartphone, personal computer such as a desktop or laptop, a smart TV, a tablet devices or any other suitably enabled device.

Figure 2:
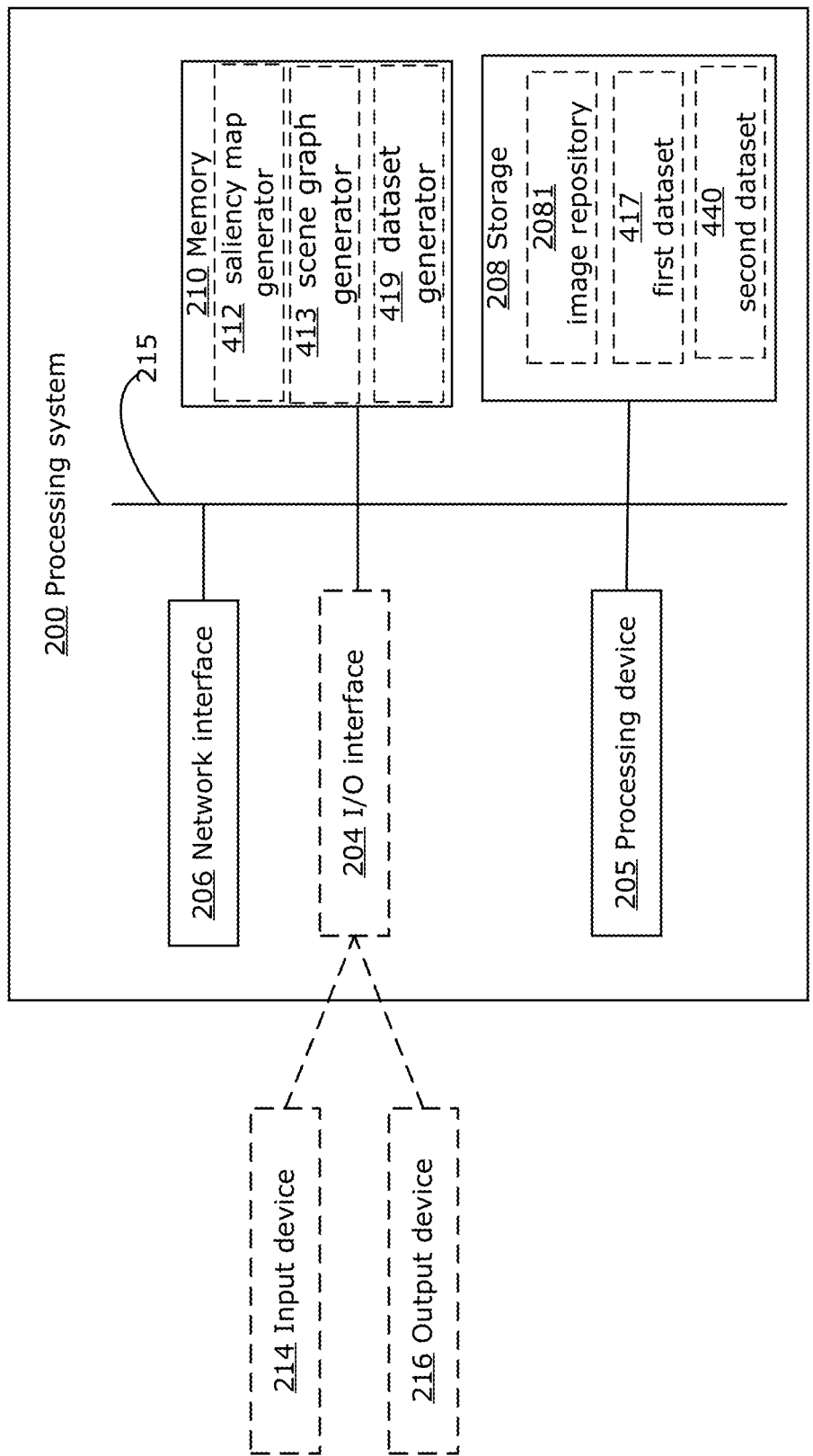
FIG. 2 is a block diagram illustrating an example processing system that can be employed to implement the methods and system disclosed herein.

FIG. 2 is a block diagram of an example simplified processing system 200, which may be used to implement embodiments disclosed herein. The example processing system 200 described below, or variations thereof, may be used to implement the server 150 or the ED 102 or any components of the communication system 100. Other processing systems may be suitable for implementing embodiments described in the present disclosure, and may include components different from those discussed below. Although FIG. 2 shows a single instance of each component, there may be multiple instances of each component in the processing system 200 (e.g., when the processing system 200 is used to implement the server 150 or the ED 102).

The processing system 200 may include one or more processing devices 205, such as a central processing unit (CPU), a graphics processing unit (GPU), a tensor processing unit (TPU), a neural processing unit (NPU), an application-specific integrated circuit (ASIC), a field-programmable gate array (FPGA), a dedicated logic circuitry, or combinations thereof. The processing system 200 may optionally include one or more input/output (I/O) interfaces 204, to enable interfacing with one or more optional input devices 214 and/or output devices 216. The processing system 200 may include one or more network interfaces 206 for wired or wireless communication with the communication network 130 or peer-to-peer communication with other processing system. The network interface(s) 206 may include wired links (e.g., Ethernet cable) and/or wireless links (e.g., one or more antennas) for intra-network and/or inter-network communications.

The processing system 200 may also include one or more storage units 208, which may include a mass storage unit such as a solid state drive, a hard disk drive, a magnetic disk drive and/or an optical disk drive. In some examples, the storage unit(s) 208 may include an image repository 2081 for storing digital images. The image repository 2081 can be accessed remotely via wireless or wired communication network, and/or be accessed locally by the entity which the image repository 2081 resides. In some examples, one or more first datasets 417 may be stored within the one or more storage units 208. In other examples, one or more second datasets 440 may be also stored within the one or more storage units 208. Details of the first dataset(s) 417, the second dataset(s) 440, and the image repository 2081 will be discussed further below.

The processing system 200 may include one or more non-transitory memories 210, which may include a volatile or non-volatile memory (e.g., a flash memory, a random access memory (RAM), and/or a read-only memory (ROM)). The non-transitory memory(ies) 210 may store instructions for execution by the processing device(s) 205, such as to carry out example methods described in the present disclosure. The memory(ies) 210 may store other software (e.g., instructions for execution by the processing device(s) 205), such as an operating system and other applications/functions. In some examples, one or more data sets and/or modules may be provided by an external memory (e.g., an external drive in wired or wireless communication with the processing system 200) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage. In some examples, a machine-learning system 410 that includes a saliency map generator 412, a scene graph generator 413, and a dataset generator 419 may be implemented using instructions stored within the memory 210. The machine-learning system 410 may be implemented at the server 150, or another network entity, for example the machine-learning system 410 may be implemented at the ED 102. The machine-learning system 410 including the saliency map generator 412, the scene graph generator 413 and a dataset generator 419 will be discussed further below.

Returning to FIG. 2, there may be a bus 215 providing communication among components of the processing system 200, including the processing device(s) 205, optional I/O interface(s) 204, network interface(s) 206, storage unit(s) 208 and/or memory(ies) 210. The bus 215 may be any suitable bus architecture including, for example, a memory bus, a peripheral bus or a video bus.

In FIG. 2, the optional input device(s) 214 (e.g., a keyboard, a mouse, a microphone, a touchscreen integrated into a display device which may include a UI and/or a keypad) and optional output device(s) 216 (e.g., a display device which may include a UI, a speaker and/or a printer) are shown as external to the processing system 200. In other examples, one or more of the input device(s) 214 and/or the output device(s) 216 may be an internal component of the processing system 200. In the case of the ED 102, input device(s) 214 will include a display device having a display screen and a user interface (UI) navigation device (for example a touchpad, a mouse or a handheld controller) for allowing a user to interact with items displayed by the display device. The output device(s) 216 will also include a display device having a display screen and a user interface (UI) navigation device for displaying generated results of the ED 102. In some embodiments, the ED 102 may include a touchscreen display for displaying generated results of the ED 102 and for allowing a user to interact with items displayed by the display device.

Traditionally, when the ED user 160 inputs a query to search for or select one or more digital images from one or more image libraries (e.g., an album within the ED 102 or image repositories online (e.g., from the server 150 or the image repository 2081 of an entity in the communication system 100), a large number digital images is returned and may be displayed on a user interface (UI) of the ED 102. It may be onerous for the ED user 160 to further filter the search results for digital images that accurately satisfy their query.

Figure 3:
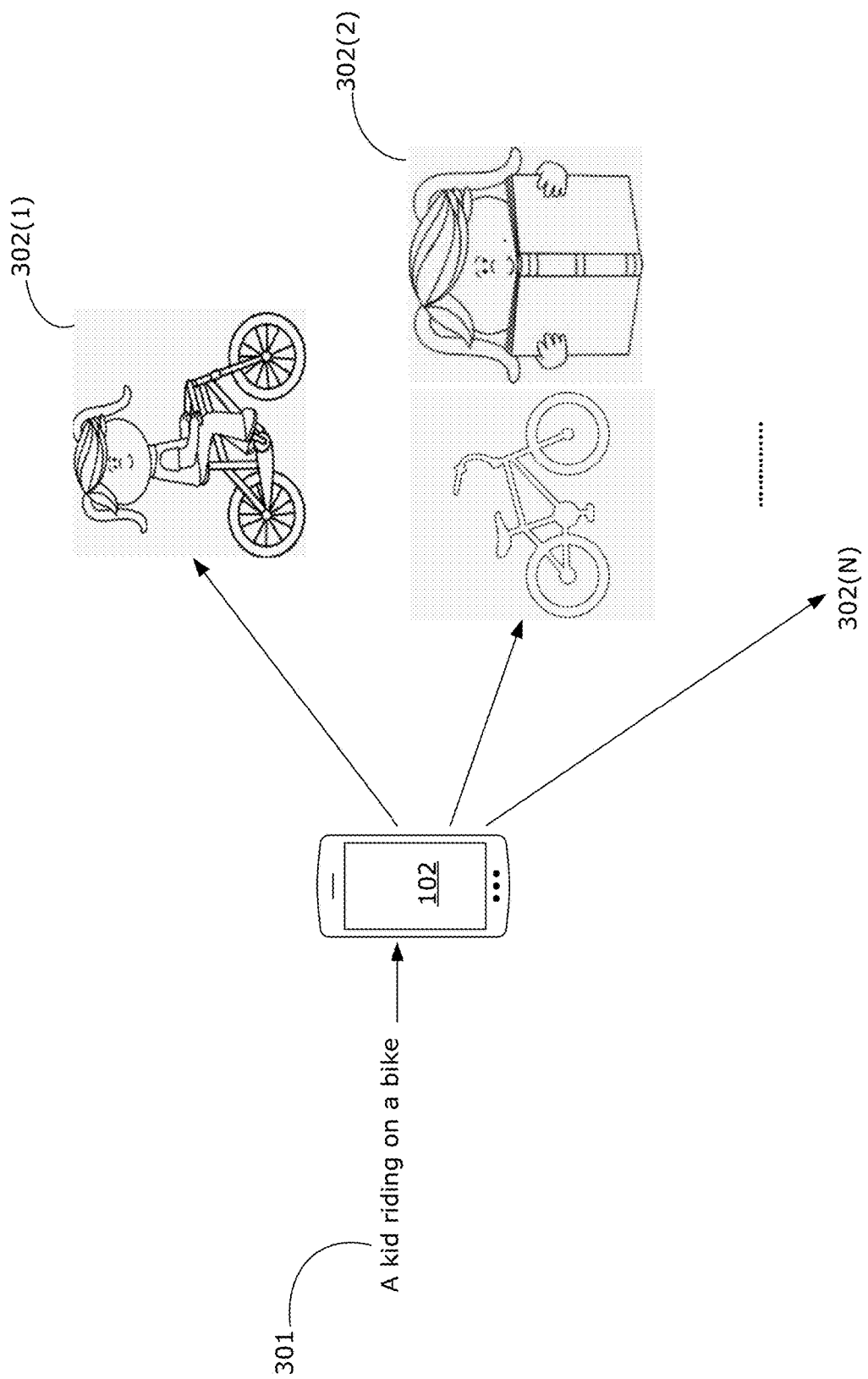
FIG. 3 is a diagram illustrating an example prior art method of searching for an image based on a query.

FIG. 3 illustrates an example of search results that are returned when the ED user 160 performs a conventional image search using the UI of the ED 102. As shown in FIG. 3, a query 301 "a kid riding on a bike" is received at the ED 102. The conventional image search may return a plurality of digital images 302(1)-302(N), which may be displayed on the display device of the ED 102 sequentially or concurrently. As presented in FIG. 3, the returned digital images 302(1)-302(N) includes the digital image 302(2) which shows a kid reading a book beside a bike. The digital image 302(2) does not satisfy the semantic meaning of the query 301. Such an inaccurate image search may require the ED user 160 to spend a lot of time to choose the desired digital image(s) from a large amount of returned images (which potentially include many digital images that do not match the query).

One existing approach for improving the accuracy of an image query uses dense captioning systems to detect objects and describe regions in a digital image (hereinafter "image"). However, the generation of dense captures is typically computationally expensive and uses large amounts of storage resource to store such dense captions for a single image. For example, a single high resolution image may contain a large number of objects and object relationships, which requires long narrations in dense captions. Such narrations may be computationally expensive to store and to search, particularly when there are many such images to take into consideration.

Moreover, conventional image editing applications may be inconvenient and unfriendly for the ED user 160 to perform image cropping. For example, conventional image applications editing may require significant manual input and control from the ED user 160, which may be time-consuming and may require the ED user to be familiar with those image editing applications. In some existing approaches, a saliency map may be used to implement conventional image cropping. However, this method may still lead to inaccurate and/or inefficient image cropping. What is more, even if the image is cropped to one or more desired regions, it may be difficult to ensure that the cropped regions are visually pleasing.

The present disclosure describes example methods for processing images, including detecting object pairs of the images and recognizing relationships between object pairs for one or more salient portions of an image. In some examples, the disclosed methods and systems may help to generate simplified dataset entries for an image, and may enable more convenient and/or simpler management of information for images using the dataset. In some examples, selecting images based on the generated dataset may help to improve accuracy in selecting and returning images that satisfy a search query. In some examples, there may be a reduction in computational cost to generate cropped images which are more visually pleasing. The disclosed methods and systems may be used in various applications, including implementation in wireless communication systems.

Figure 4A:
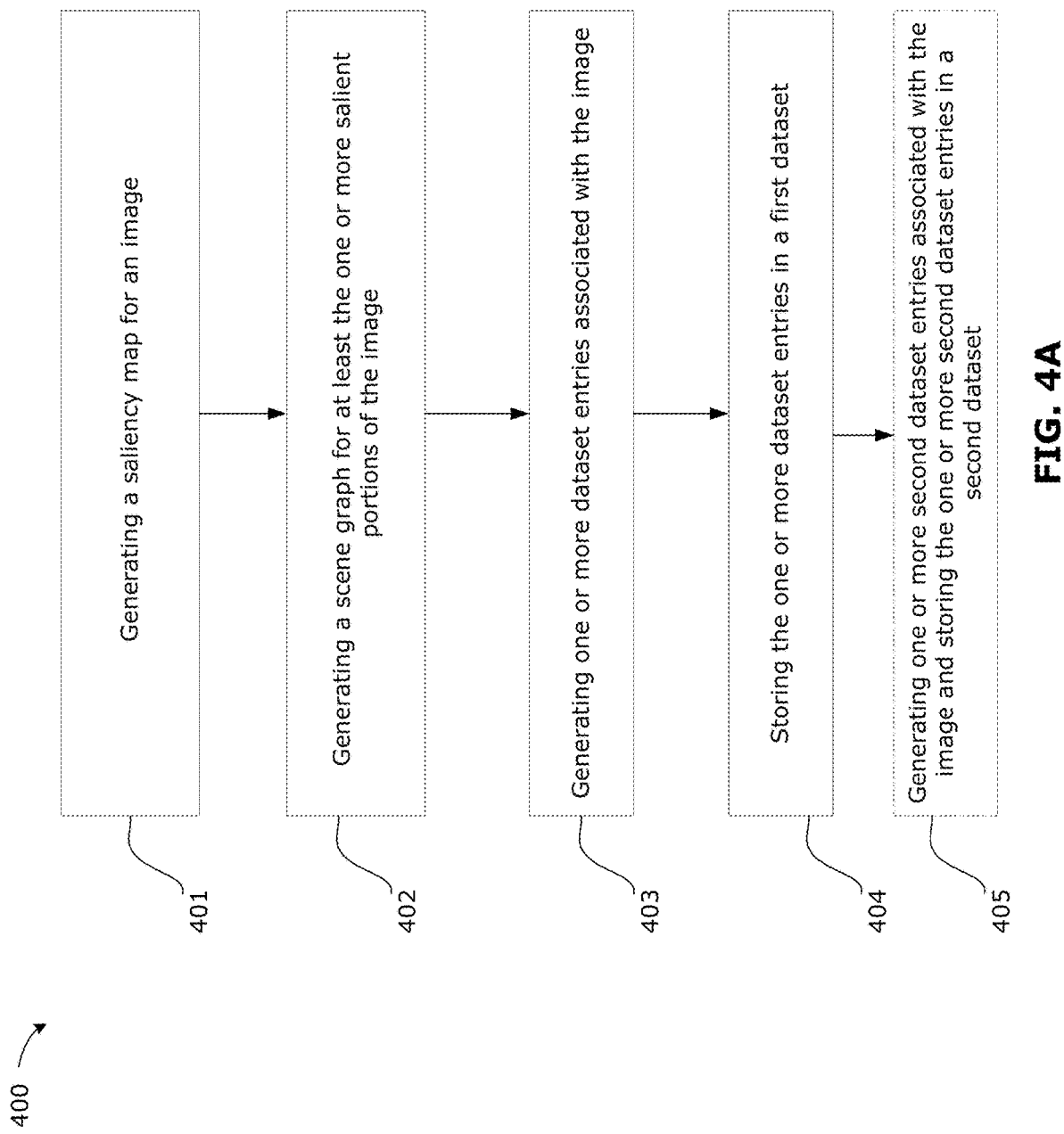
FIG. 4A is a flowchart illustrating an example method for generating a dataset including one or dataset entries associated with the image, in accordance with an example of the present disclosure.
Figure 4B:
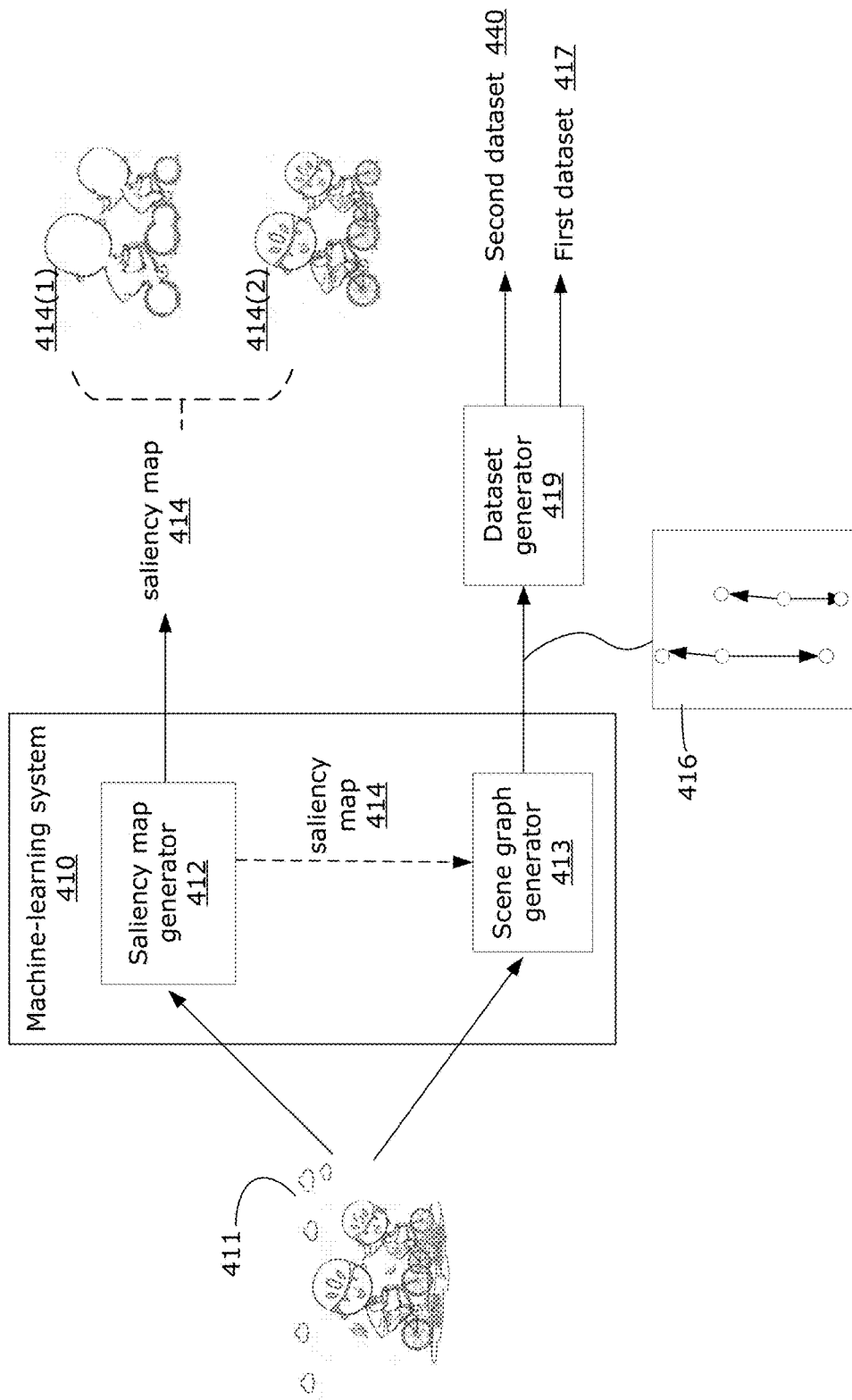
FIG. 4B is a schematic diagram of an example machine-learning system configured to generate a first dataset for an image, in accordance with one example embodiment of the present disclosure.

FIG. 4A is a flowchart of an example method 400 for processing an image in according to an example embodiment. FIG. 4B shows an example machine-learning system 410, which may be implemented in the server 150. In some examples, the example machine-learning system 410 may be implemented in other components within the communication system 100, such as an ED 102, network 130, computer 140, cellular network 192, and so on. In other examples, the example machine-learning system 410 may be used in any combination of components within the communication system 100. The machine-learning system 410 performs the example method 400 for image searching and image cropping in accordance with an example embodiment. For simplicity, the following discussion refers to the example where one single image is processed. However, it should be understood that the following discussion may be similarly applicable to cases where multiple different images are processed. The method 400 is now described.

At step 401, a saliency map for an image is generated. The saliency map, introduced further below, indicates one or more salient portions of the image that have saliency values satisfying a saliency criterion. In some examples, generating the saliency map for an image may be performed by a saliency map generator, such as saliency map generator 412 of the machine-learning system 410. A saliency map generator may be a machine learning module that is provided with a training dataset comprising images and derives a model for performing saliency detection and region of interest extraction on the images using any suitable machine learning algorithm. In some examples, the saliency map generator may be implemented using a first neural network that has been trained with a training dataset to perform saliency detection and region of interest extraction on input images (e.g., identify one or more salient portions of an input image). By way of non-limiting example, in one possible configuration, the first neural network may be a first deep neural network that includes an input layer, multiple hidden layers, and an output layer that has been trained using a training dataset to perform saliency detection and region of interest extraction on an input image. The first deep neural network can be trained, for example, based on an accuracy requirement of the saliency detection. In some examples, the first neural network may be trained iteratively to minimize a loss function. The loss function is a function that is designed to optimize performance of the first neural network for generation of the saliency map in order to produce a saliency map with high accuracy. The training data for training the first neural network may include images from a searchable image repository, for example, or the training data may be generated from another suitable source and pre calculated saliency values saliency values. Once the first neural network of the saliency generator 412 is trained, the saliency generator 412 predicts saliency maps 414 for images, which are to be input to the scene graph generator 413 as described in further detail below.

Generation of the saliency map will be described further with reference to FIG. 4B.

At step 402, a scene graph for at least the indicated one or more salient portions of the image is generated. The scene graph represents a plurality of objects detected in the image. In some examples, the plurality of objects may be detected within at least the one or more salient portions. In some examples, the plurality of objects may be a subset of all objects detected within the entire image. For example, the subset of objects may be generated by selecting objects that are within the salient portions of the image, from among all detected objects. An example of this will be discussed further with reference to FIG. 4B. The scene graph may identify one or more object pairs formed by the plurality of detected objects. The scene graph further represents one or more relationships between each respective object pair. Detecting the plurality of objects in the image and how to generate the scene graph will be discussed in greater detail below.

In some examples, generating the scene graph may be performed by a scene graph generator, such as the scene map generator 413 of the machine-learning system 410. The scene graph generator 413 may be a machine learning module that is provided with a training dataset comprising images and a saliency maps for the images and derives a model for performing scene graph generation for a new image and saliency maps corresponding to the new image (e.g. detects objects in a new image and recognizes relationships between object pairs of a new image) using any suitable machine learning algorithm. In some examples, the scene graph generator may be implemented using a second neural network that has been trained (e.g. learned) to perform scene graph generation from images. By way of non-limiting example, in one possible configuration, the second neural network may be a second deep neural network that includes an input layer, multiple hidden layers, and an output layer that has been trained using a training dataset to perform scene graph generation on an input image. The second deep neural network can be trained, for example, based on an accuracy requirement of the scene graph generation. In some examples, the second neural network may be trained iteratively to minimize a loss function. The loss function is a function that is designed to optimize performance of the second neural network for generation of the scene graph in order to produce a scene graph with high accuracy. The training data for training the second neural network may include labels and bounding box coordinates of objects contained in images, and labels and bounding box coordinates of the relationship among object pairs in images. The training data may be obtained from images retrieved from a searchable image repository, for example, or the training data may be generated from another suitable source.

At step 403, one or more dataset entries are generated to be associated with the image. Each dataset entry indicates a respective one of the relationships represented in the scene graph for the one or more object pairs. Each dataset entry represents the relationships for an object pair relevant to at least the salient portions of the image. For example, each dataset entry may include a triplet which describes the relationship between a respective object pair as discussed further below. Each respective dataset entry may further include an index 418(1), 418(2), . . . , 418-(n) (generically referred to as index 418) which identifies the respective dataset entry, and image information which identifies the associated image, such as an identifier of the associated image 411(1). In some examples, a dataset generator, such as a dataset generator 419 shown in FIG. 4B, may generate the one or more dataset entries associated with the image as discussed further below.

At step 404, the one or more of the first dataset entries are stored in a first dataset (e.g., a first dataset 417 shown in FIG. 4F). In some examples, a dataset generator, such as the dataset generator 419 shown in FIG. 4B, may store the one or more dataset entries associated with the image in the first dataset 417 and output the first dataset 417.

At step 405, optionally, one or more second dataset entries are generated to be associated with the image and stored in a second dataset (e.g., a second dataset 440 shown in FIG. 4G). In some examples, the dataset generator 419 shown in FIG. 4B, may generate the one or more second dataset entries and store the one or more second dataset entries in the second dataset 440. Each respective second dataset entry may include an index 418 which identifies the respective dataset entry in the first dataset, image information which identifies the associated image, bounding box information which identifies the bounding box associated with the detected object that is represented by the scene graph, and location parameters for the bounding box associated with the detected object that is represented by the scene graph. The location parameters can be used to locate an identified object pair within an image.

Generation of the first and second datasets 417, 440 by the dataset generator 419 will be discussed in detail with reference to FIG. 4E.

In some examples, the scene graph may be pruned to be relevant only to the salient portions of the image. This may help to reduce the number of detected objects and relationships that need to be processed, which may help to reduce the computational cost. Limiting processing to only the salient portions of the image (rather than the entire image)

may help to improve efficiency in generation of scene graphs, and may help to improve overall computational efficiency.

An example process for generation of the saliency map and the scene graph is now described in greater detail with reference to FIG. 4B. FIG. 4B illustrates an example in which generation of the saliency map and the scene graph is implemented using a machine-learning system (e.g., the machine-learning system 410). Referring to FIG. 4B, a saliency map generator 412 receives an image 411 and generates a saliency map 414 for the image 411, for example illustrated above with reference to step 401 of the method 400. Although one image 411 is received and processed by the machine-learning system 410 as an example illustrated and discussed below, this is only illustrative and is not intended to be limiting. The saliency map 414 represents where areas of interest (e.g., the one or more salient portions including salient objects) in the image 411 are located, based on information about the content of the image 411. For example, saliency of a pixel may depend on how much that pixel differs (e.g., in color and/or intensity) from other pixels in the image. The saliency indicates how much a pixel (or image portion) relates to a main focus of the image. The saliency of a pixel reflects the characteristics of the pixel, for example in terms of color, intensity, orientation, depth, and/or motion contrast with neighbours, among other possible characteristics. The saliency of a pixel may indicate the relevancy of that pixel to the overall content of the image.

Each pixel of the image 411 may be assigned with a saliency value which represents saliency of the pixel relative to other pixels in the image. In some examples, each image portion of the image 411 (rather than each pixel) may be assigned with a saliency value. The image portions may be defined, for example, in accordance with accuracy or other requirements for performing the saliency detection. In an example, one characteristic (e.g., color) may be used to determine the saliency of each, and a saliency value may be assigned to each pixel ranging between 0 and 1. A rating of 0 indicates that the pixel is a completely irrelevant pixel in terms of intensity (e.g., lower intensity of the pixel means less saliency), and a rating of 1 indicates that the pixel is an absolutely relevant pixel. The saliency map generator 412 identifies the one or more salient portions by detecting the image portions having corresponding saliency values that satisfy one or more saliency criteria. A saliency criterion could be a criterion which stipulates that a salient portion must contain pixels having saliency values that are above a threshold, or that salient portions include the pixels having the top 10% of the assigned saliency values, or some other criterion.

After evaluating the saliency values of the pixels using the saliency criterion, the saliency map generator 412 generates a saliency map 414 for the image. The saliency map 414 may have different formats, such as a saliency map 414(1) and/or a saliency map 414(2). For example, as shown in FIG. 4B, the saliency map 414(1) may represent boundaries or contours of each salient portion detected from the image 411. Pixels within a given salient portion may share certain characteristics, such as, color, intensity, or texture. In other examples, the saliency map 414(2) may not only represent the boundaries of different salient portions, but also represent content details of each of the one or more salient portions. For example, the saliency map 414(2) may include the image portion enclosed by the boundaries of each salient portion. The saliency maps 414(1) and 414(2) are generically referred to as a saliency map 414. It should be understood that in this example, only one single saliency map 414 is generated which can have the format 414(1) or the format 414(2). In other examples, more than one saliency map 414 may be generated each of which may have any suitable format.

As shown in FIG. 4B, two helmets, a boy, a girl, and two bikes are dominant objects in the image 411. Such objects are referred to herein as salient objects. Other objects in the image 411, such as clouds and grass, are less important, which may be located in background of the image 411. Such objects are generically referred to herein as background objects. The dominance or importance of each object may be determined with respect to intensity of pixels of each object (or other measure of saliency). In other possible configurations, the dominance or importance of an object may be determined in respect to size of each object, color of pixels of each object, and/or any other suitable configurations. Thus, the saliency map 414 may define the saliency portions based on the boundaries of salient objects and may omit background objects of the image 411.

Although the saliency map 414 as shown in FIG. 4B is demonstrated in black and white, this is for ease of illustration; in some applications, the saliency map 414 may have color and may retain similar or identical characteristics (e.g., color, intensity, or texture) as the image 411. It should also be understood that, although the image 411 shown in the example of FIG. 4B is black and white, this is only for illustrative purposes and is not intended to be limiting; in other examples, the image 411 may be in color and may have any other suitable image characteristics.

With respect to generating the scene graph, as presented in FIG. 4B, the scene graph generator 413 receives the image 411 and generates a scene graph 416 for at least the salient portion(s) indicated by the saliency map 414, such as discussed in step 402 of the method 400 in FIG. 4A. The scene graph 416 represents a plurality of objects detected in the image 411. The plurality of objects may only include objects detected within the boundaries of the salient portion(s) indicated by the saliency map 414 (e.g., the saliency map 414(2) may be input to the scene graph generator 413 in the example of FIG. 4B). In some examples, object detection and object classification is performed (e.g., using any suitable object detection and classification algorithm) within the boundaries of the salient portion(s) of the image 411, to generate nodes of the scene graph 416.

As shown in the scene graph 416, the objects forms one or more object pairs, and the one or more object pairs are not exclusive. That is, one object can be in two different object pairs, e.g., a and b can be one object pair, and a and c can be also an object pair. As represented in FIG. 4B, objects in each object pair are connected by at least one line associated with an arrow, and each arrow denotes a relationship between the object pair. As demonstrated in FIG. 4B, only one line is used to denote one relationship between an object pair. This is only an example, in other examples, more than one single line may be used to denote more than one relationship between the object pair. As such, each node of the scene graph 416 corresponds to a detected object. Each line between a pair of objects within the second graph 416 corresponds to a respective relationship. It should be understood that the scene graph 416 as shown in the present figures is only representative, and the scene graph 416 may be generated in any suitable format.

The dataset generator 419 receives the scene graph 416 from the scene graph generator 413, and generates one or more dataset entries associated with the image, for example as disclosed with reference to step 403 of the method 400. Furthermore, the dataset generator 419 stores the one or more generated dataset entries associated with the image in a first dataset 417, and outputs the first dataset 417, for example as described above with reference to step 404 of the method 400. Optionally, the dataset generator 419 generates one or more second dataset entries associated with the image, stores the one or more second dataset entries associated with the image in a second dataset 440, and outputs the second dataset 440, for example as described above with reference to step 405 of the method 400. Generation of the first and second datasets 417, 440 will be discussed with reference to FIG. 4E, and formats of the first and second dataset 417, 440 are illustrated in FIGS. 4F and 4G respectively.

It should be understood that although in the example shown in FIG. 4B, the first and second datasets 417, 440 are output by the dataset generator 419 which is shown as being separate from the machine-learning system 410, in other examples, the dataset generator 419 may be included within the machine-learning system 410.

Figure 4C:
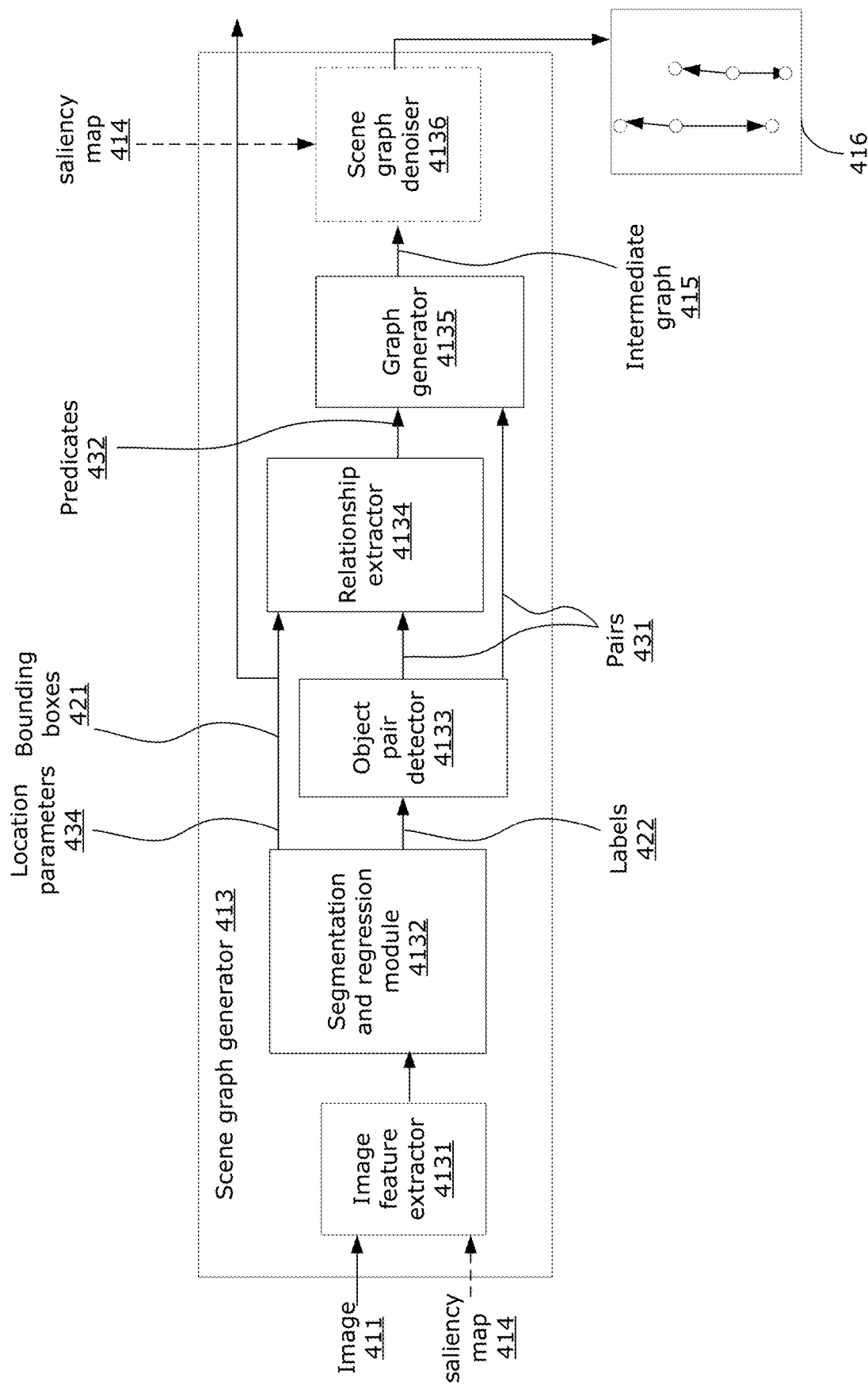
FIG. 4C is a schematic diagram of an example scene graph generator that may be implemented in the system of FIG. 4B.
Figure 4E:
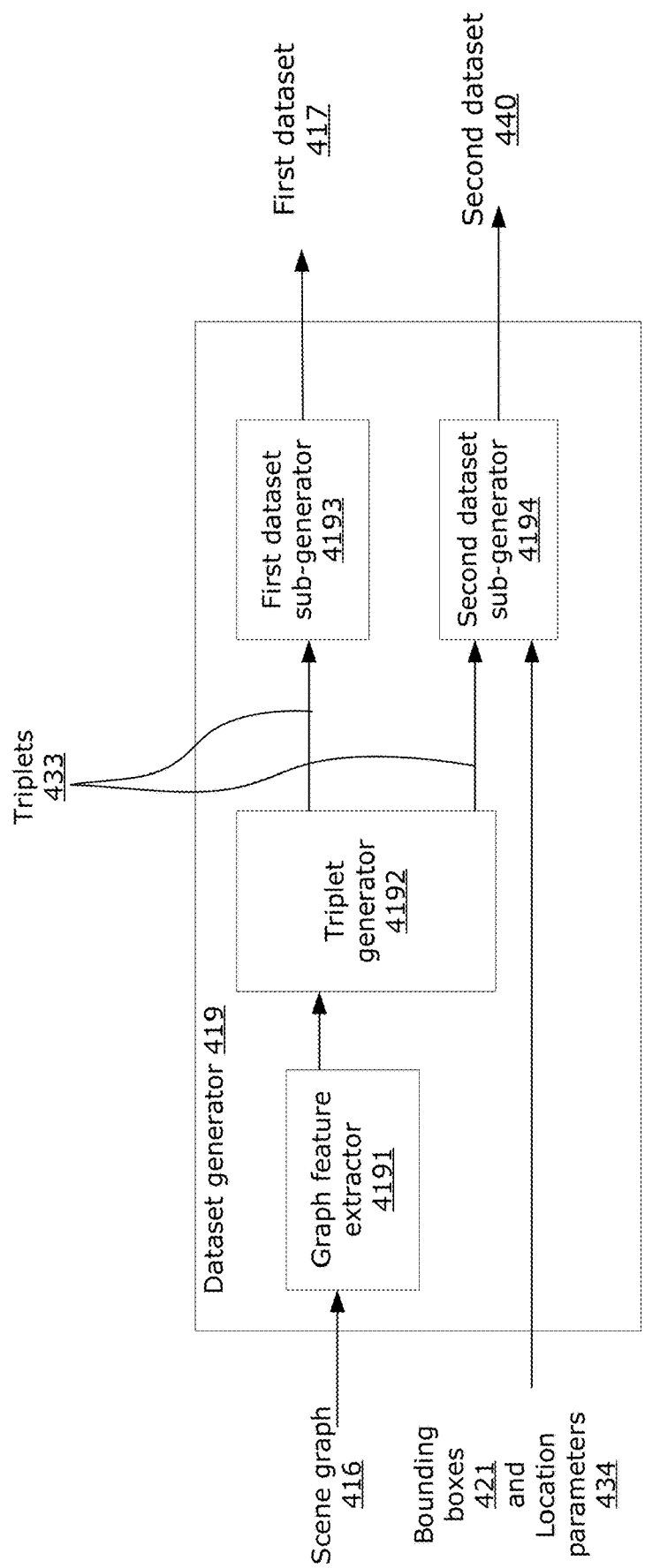
FIG. 4E is a schematic diagram of a dataset generator that may be implemented in the system of FIG. 4B.

Reference is now made to FIG. 4C, which illustrates an example of the scene graph generator 413 which detects objects in an image and recognizes relationships between object pairs of the image. In this example, the scene graph generator 413 includes an image feature extractor 4131, a segmentation and regression unit 4132, an object pair detector 4133, a relationship extractor 4134, a graph generator 4135, and an optional scene graph denoiser 4136. The scene graph generator 413 may be implemented as a single deep neural network, in which case the image feature extractor 4131, the segmentation and regression unit 4132, the object pair detector 4133, the relationship extractor 4134, the graph generator 4135, and/or the scene graph denoiser 4136 are different layers of the single deep neural network. The single deep neural network is trained using a training dataset comprising known images and saliencies maps corresponding to the images to learn to derive a model to generate a scene graph for a new image and a new saliency map for the image input to the single deep neural network. In other examples, each of the image feature extractor 4131, the segmentation and regression unit 4132, the object pair detector 4133, the relationship extractor 4134, the graph generator 4135, and the optional scene graph denoiser 4136 may be implemented using different respective deep neural network each of which has been trained to perform a separate task, such as feature extraction, object detection, label generation, bounding box generation, and relationships recognition between object pairs of the image.

FIG. 4D shows an example of a bounding box 421(1) and a label 422 that may be generated when the scene graph generator 413 performs object segmentation and regression on the image 411. Feature vectors of a plurality of detected objects 420 within the image 411 may be extracted by the image feature extractor 4131, for example using an object localization algorithm. The segmentation and regression unit 4132 receives the feature vectors of the plurality of objects from the feature extraction unit 4131 and generates labels 422 and bounding boxes 421 for each of the plurality of objects 420. In this example, the segmentation and regression unit 4132 performs objection classification to assign a label 422(1), 422(2), . . . , 422(n) associated with an object class of interest (e.g., boy, helmet, bike, girl, helmet, and bike) to each detected object 420. The plurality of labels 422(1)-(n) are generically referred to as label 422 hereinafter.

The segmentation and regression unit 4132 further generates bounding boxes 421 for each detected object 420. For example, as shown in FIG. 4D, a detected object 420(1) is assigned a label "helmet" 422(1) and is associated with a bounding box 421(1). For simplicity, FIG. 4D only shows one object 420(1), one bounding box 421(1) and label 422(1); however, it should be understood that there may be multiple objects, bounding boxes and labels generated, for different objects detected in the image. In addition, for each bounding box 421, the segmentation and regression unit 4132 may generate corresponding location parameters 434 for the bounding box 421. For example, the location parameters 434 for the corresponding bounding box 421 can be represented by values in three-dimensional or two-dimensional coordinates. In this example, for the bounding box 421(1), the corresponding location parameters 434 may define the coordinates of the four corners (e.g., (x1y1), (x2y2), (x3y3), and (x4y4)) of the bounding box 421(1). A second dataset entry may be generated by the dataset generator 419 that includes the index 418(i), image information identifying the image 411(1), bounding box information which identifies the bounding box 421(1) and location parameters 434 for the bounding box 421(1) The second dataset entry may be stored in a second dataset 440 by the dataset generator 419 and the second dataset 440 may be output by the dataset generator 419, as discussed further with reference to FIG. 4E.

The object pair detector 4133 receives the labels 422 and determines which objects from the detected objects can form different object pairs 431. In this example, the object pairs 431 are determined by the object pair detector 4133. In other examples, the object pairs 431 may be determined by another network (not shown) or any other algorithm. As discussed above, each object pair 431 is not exclusive. One object can be in two different object pairs 431. For example, in the object pairs, "helmet" and "boy" may form a first object pair, and "boy" and "bike" may form a second object pair, with the object "boy" being common to both object pairs.

After the object pairs 431 have been generated, the relationship extractor 4134 performs relationships extraction between each respective object pair 431. The relationship extractor 4134 may use predicate inference algorithms to achieve the relationship extractions, in order to recognize subjects and objects pair-wise relationships. A plurality of predicates 432, each of which represents interactions between a respective object pair 431, are recognized. The relationship extractor 4134 receives the generated bounding boxes 421 from the segmentation and regression unit 4132 and the object pairs in this example. With respect to performing predicate inference, the relationship extractor 4134 may identify two bounding boxes 421 which correspond to each object pair 431, and calculate at least one vector to connect the two bounding boxes 421 associated with the object pair 431. Then one or more predicates 432 between the object pair 431 may be inferred by the relationship extractor 4134 using the at least one calculated vector. The graph generator 4135 receives the object pairs 431 generated by the object pair detector 4133 and the recognized predicates 432 output by the relationship extractor 4134. Based on the object pairs 431 and the recognized predicates 432, the graph generator 4135 then generates a scene graph, which represents the relationships between respective object pairs 431.

As shown in FIG. 4C, the scene graph generator 413 may further include an optional scene graph denoiser 4136 to remove background objects from the scene graph output by the graph generator 4135. In that case, the scene graph generated by the graph generator 4135 may be referred to as an intermediate scene graph 415. The graph generator 4135 may generate an intermediate scene graph 415 by performing object detection over the entire image 411. In such an example, every detected object, including the salient objects and the background objects, is represented in the intermediate scene graph 415. Then the scene graph denoiser 4136 prunes the intermediate scene graph 415 based on an optional saliency map 414 input, and outputs the scene graph 416 that only represents the salient objects and omits background objects. Pruning of the intermediate scene graph 415 may be performed in accordance with the boundaries of the salient portions as indicated by the received saliency map 414. As the scene graph 416 is generated to represent only the objects falling within the boundaries of the salient portions indicated by the received saliency map 414, the objects in the scene graph 416 may be a subset of all detectable objects of the entire image 411. Accordingly, the number of objects represented by the scene graph 416 may be less than or equal to the number of objects represented in the intermediate scene graph 415. Reducing the number of objects in the scene graph 416 in this way may help to reduce the number of objects that need to be processed to generate the relationships (discussed further below) represented by the scene graph 416, which may help to save computational cost.

In some examples, the scene graph denoiser 4134 may be omitted. The scene graph 416 may be directly generated (rather than being the result of pruning the intermediate scene graph 415). In such an example, the scene graph generator 413 may be used to process only the salient portions of the image 411 (as indicated by the saliency map 414). For example, the image feature extractor 4131 may extract features from only the indicated salient portions of the image 411, and accordingly the labels 422 and bounding boxes 421 would be generated only for those features extracted from the salient portions of the image 411. For ease of understanding, the following discussion focuses on an example in which labels and bounding boxes are generated only for the salient objects.

Generating first and second datasets 417, 440 is now discussed with reference to FIG. 4E in greater detail. In this example, the dataset generator 419 includes a graph feature extractor 4191, a triplet generator 4192, a first and a second dataset sub-generator 4193 and 4194. The graph feature extractor 4191 receives the scene graph 416 discussed above from the scene graph generator 413, and extracts graph features of the scene graph 416. The graph features may include object pairs 431 corresponding to nodes in the scene graph 416, and predicates 432 corresponding to lines in the scene graph 416. The triplet generator 4192 receives the extracted features of the scene graph 416 and generates triplets to represent relationships of object pairs 431 of the extracted features. The triplets may be represented as <subject, predicate, object> 433(1)-433(n) (generically referred to as a triplet 433). "Subject" and "object" of <subject, predicate, object> refer to the grammatical sense of subject and object. The "subject" and "object" forming an object pair 431 represent the objects 422 labelled by the segmentation and regression unit 4132.

It should be understood that the triplet 433 is only an example format for representing a relationships in an object pair. Other formats may be used, as appropriate. Further, a triplet 433 may represent an object pair 431 and its associated relationship predicate 432 in a different format. Orders of <subject, predicate, object> may be varied to represent a triplet, for example using <subject, object, predicate>, <object, predicate, subject>, or <object, subject, predicate >, and so on. In other examples, the subject, object and/or predicate of a triplet may be indicated by indexes or symbols instead of words. For example, predicate "on" of the triplet <helmet, on, boy> can be also represented by a symbol "+". Therefore, a triplet <helmet+boy> may be used to represent an identical pair relationship to the triplet <helmet, on, boy>. For simplicity, the present disclosure will refer to the use of triplets 433 having the format <subject, predicate, object>. Each triplet 433 corresponds to a respective relationship between a respective object pair 431. For example, as shown in FIG. 4F, triplets 433(1) (e.g., <boy, ride, bike>), 433(2) (e.g., <girl, ride, bike>), and etc. are generated to represent the relationships between the object pairs 431 of the image 411(1).

The first dataset sub-generator 4193 receives the triplets 433 from the triplet generator 4192, generates dataset entries that each include a triplet 433. The first dataset sub-generator 4193 also stores the dataset entries in a dataset, such as the first dataset 417, and outputs the first dataset 417. As shown in FIG. 4F, each dataset entry that is generated includes a triplet 433 corresponding to an object pair and relationship identified in the image 411. Each dataset entry may also include an index 418, and information which identifies the image (e.g., an identifier of the image 411). In some examples, each dataset entry may also include the detected labels 422 of the object pair in the triplet 433.

With respect to generation of the second dataset 440, the second dataset sub-generator 4194 receives triplets 433 from the triplet generator 4192 as input, and also receives the bounding boxes 412 and location parameters 434 which are generated by the segmentation and regression unit 4132 (as shown in FIG. 4C) as input, and outputs the second dataset 440. Based on the received triplets 433 and received location parameters 434, for each triplet 433, the second dataset sub-generator 4194 identifies bounding boxes of the object pairs of the triplet, finds locations parameters 434 of the identified bounding boxes 421 from all the received location parameters, and generates second dataset entries that are stored in the second dataset 440. An example of the second dataset 440 is now described with reference to FIG. 4G. The second dataset 440 includes second dataset entries. Each second dataset entry includes location parameters 434 for bounding boxes 421 for each object in a triplet 433. Each second dataset entry includes image information which identifies the associated image, such as an identifier of the associated image 411(1). Each second dataset entry also includes the index 418 of a dataset entry in the first dataset 417. In this example, the second dataset entries stored in the second dataset 440 may include the same indices as the dataset entries stored in the first dataset 417. Each second dataset entry also includes bounding box information identifying the bounding boxes 421(1)-421(n) for objects in a single triplet 433. In other words, the second dataset entry in the second dataset 440 includes an index 418 that is identical to (or is a reference to) the index 418 that is included in the dataset entry in the first dataset that includes the triplet 433. The inclusion of the index 418 in dataset entries in the first and second datasets 417, 440 enables the first and second datasets 417, 440 to reference each other. For example, a dataset entry having the index 418(1) in the first dataset 417 includes a first triplet 433(1). The location parameters 434 for the bounding boxes 421(1)-(n) for the object pair indicated by the triplet 433(1) may be determined by searching for a second dataset entry in the second dataset 440 that includes the same index 418(1). The bounding box information which identifies bounding boxes for the objects in the triplet, and the location parameters for the bounding boxes may be used to crop one or more image, as explained in later discussion.

As shown in FIG. 4G, each respective dataset entry may include bounding box information in the form of numerical references which may be used to identify different respective bounding boxes 421. In other examples, the bounding boxes 421 may be identified by the detected associated labels, such as helmet_1, boy, girl, bike_1, etc. Although numerical references are used to identify the indices in the example shown in FIG. 4G, in other examples the indices 418 may be identified by alphabet letters, such as A, B, C, or any other suitable approach. In some examples, the second dataset 440 may further include other information (e.g., image size, image number/title, physical storage address of the image) associated with a respective image 411.

In this example, dataset entries including location parameters 434 for corresponding bounding boxes 421 of a plurality of different images 411 may be stored within a single second dataset 440. In other examples, separate instances of the second dataset 440 may be used to store dataset entries related to different images 411.

In some examples, triplets 433 for different images 411 are stored as corresponding dataset entries and associated with the respective image 411 within the first dataset 417. In other examples, the triplets 433 associated with multiple different images 411 may be stored in separate instances of the first dataset 417 (i.e., each instance of the first dataset 417 may be specific to a single image 411). In some examples, instead of using a separate second dataset 440 to store location parameters associated with a plurality of different images 411 as discussed above, the location parameters relevant to a triplet 433 may be stored as part of the dataset entry for that triplet 433 in the first dataset 417, such that a single dataset may be used instead of separate first and second datasets 417, 440. Other formats for storing this data may be used, for example depending on the availability of storage resources and/or the need for computing efficiencies.

Reference is again made to FIG. 4C. In some examples, the scene graph generator 413 may also include a region proposal network (RPN) (not shown). The RPN is a fully-convolutional network that predicts objects at different positions of an image simultaneously. The prediction of the objects is performed by calculating likelihood that a given position in the image contains an identifiable object. One or more proposed regions of the image 411 are then generated using the RPN. Each proposed region provides a high probability of containing at least one object. The image feature extractor 4131 may then execute an object localization algorithm to detect objects within the proposed region(s) of the image. The segmentation and regression unit 4132, the object pair detector 4133, the relationship extractor 4134, and the graph generator 4135 may then operate on the detected objects subsequently, as discussed above. In this example, the use of a RPN enables the scene graph generator 413 to generate a scene graph 416 only for the proposed region(s) of the image, rather than the entire image. This may help to reduce the computational cost of detecting objects from an image, which may help to improve efficiency for generating the scene graph, for example.

In some examples, a categorical clustering model may be employed by the deep neural network of the scene graph generator 413 to exclude low confidence bounding boxes 421, and choose predicates 432 with high confidence. In some examples, a refined benchmark dataset (e.g., De-duplicated Cleansed Visual Genome (dcVG)) may be used to train the deep neural network of the scene graph generator 413 to learn to a model for generating scene graphs from input images and evaluate the performance of the model. A refined benchmark dataset includes training data in which most or all duplicate objects and predicates have been removed, which increases the likelihood of the trained deep neural network of excluding low confidence bounding boxes. The use of a refined benchmark dataset may help to reduce the number of redundant relationships, which may help the machine-learning system 410 to operate more efficiently.

The use of a saliency map to identifying region(s) of interest (ROIs) in an image may enable determination of object pairs and relationships only for salient portions of the image. This may enable increased inference speed for relationship extraction and more efficient generation of the scene graph due to the reduced number of detected objects. The reduced number of detected objects may also help to save storage space for storing information associated with the image, and may enable more effective searching for images or processing images from a collection (e.g., in an album offline or an image repository 2081 as shown in FIG. 2).

Figure 5:
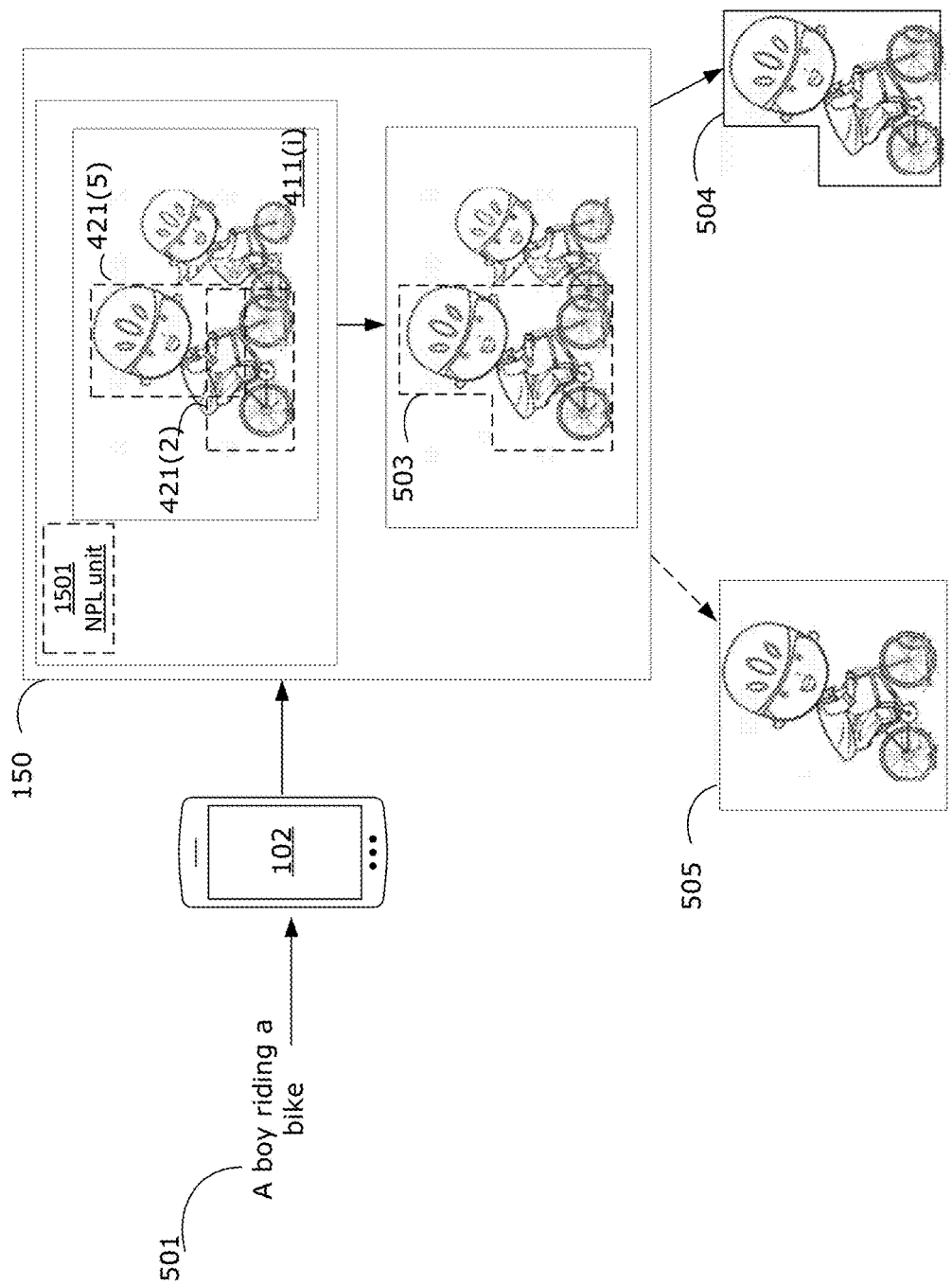
FIG. 5 is a schematic diagram of an example method to crop an image in accordance with an example embodiment of the present disclosure.

Example operations for searching images and cropping images are now discussed with greater detail with reference to FIG. 5. As shown in FIG. 5, a query 501 (e.g., "a boy riding a bike") is input at an ED 102, and the ED 102 may then send the query 501 to a server 150 which performs searching on an image repository 2081 online and/or offline. In other examples, any network entity within the communication system 100 may be used to receive the query and perform searching on the image repository 2081. In other examples, the ED 102 may do the search on an internal image repository (e.g., in an album offline or the image repository 2081 within the storage unit(s) 208 of the ED 102). In other examples, the server 150 and the ED 102 may perform searching concurrently. In some examples, the first dataset 417 and/or the second dataset 440 may be stored within any components of the communication system 100. For simplicity, the server 150 is illustrated below as an example to implement all the steps from searching to returning search output, and the first dataset 417 and/or the second dataset 440 may also be stored thereon. The server 150 may include a natural language processing (NLP) unit 1501 to process the query 501. In other examples, different entities may be used to implement the steps from searching dataset to returning search output separately.

As disclosed above, the first dataset 417 may include a plurality of dataset entries where each dataset entry includes a triplet associated with a different image. Thus, when the query 501 (e.g., "a boy riding a bike") is received at the server 150, the server 150 searches the first dataset 417 which is stored thereon to identify one or more dataset entries (e.g., stored triplets) that satisfy one or more query criteria. The query criteria can include a criterion that includes a semantic meaning of the query 501. The semantic meaning of the query 501 may be determined using the NLP unit 1501, for example. In this example, the semantic meaning of the query 501 may be "a boy is riding a bike". As discussed above, a triplet included in a dataset entry (e.g., a dataset entry that includes the index 418) in the first dataset 417 may be used to indicate a relationship of each object pair. Indices 418 included in the dataset entries of the first dataset 417 corresponding to triplets representing relationships in which a boy is riding a bike may be identified, to satisfy the semantic meaning of "a boy is riding a bike". Identifying the dataset entries including the index 418 may include first identifying dataset entries that include object pairs satisfying the query criteria. For example, dataset entries including the object pair <boy, bike> may be identified. Further, the identified dataset entries may be those triplets that represent a relationship having a semantic meaning satisfying the query criteria (in this example, that a boy is riding a bike). In this example, triplets that satisfy the query criteria can include <boy, riding, bike>, <a boy, rides, a bike>, <a boy, is riding, a bike>, or any formats which have a semantic meaning satisfying the query "a boy riding a bike". For example, the tense of the predicate, singular or plural form of the subject and object in the query may not need to be identical to the semantic meaning of the query.

Based on one or more identified dataset entries in the dataset 417, the image(s) 411 associated with the identified dataset entries are identified. In this example, the identified image(s) 411 are identified to be associated with a triplet satisfying the semantic meaning of the query 501 "a boy is riding a bike". Thus, each of the identified image(s) 411 includes the object pair <boy, bike>. As discussed above, the object pair in a dataset entry in the first dataset 417 is mapped to location parameters 434 for the bounding boxes 421 in the object pair in a second dataset entry in the second dataset 440 by including the index 418 in the two dataset entries. The server 150 can then search the second dataset 440, using the identified index 418, to identify locations parameters 434 for the bounding boxes in the object pair. For example, an image 411(i) is identified to include an object pair <boy, bike> which satisfies the sematic meaning of the query "a boy riding a bike". The dataset entry of the first dataset 417 including the index 418(i) is also identified to include the triplet 433(i). The second dataset 440 is then searched utilizing the identified index 418(i) to identify a second dataset entry that includes location parameters 434 of the object pair <boy, bike>. A plurality of coordinates values (x1 y1), . . . , (xn yn) corresponding to the identified index 418(i) are identified to be associated with the image 411(i). In this example, two-dimensional coordinate values are used as an example to represent the location parameters 434 for different bounding boxes 421. Other possible configurations, such as three-dimensional coordinate values, may be used to represent location parameters 434 in other examples.

The identified location parameters 434 (e.g., ((x1 y1), . . . , (xn yn))) may identify the coordinates of the corresponding bounding boxes 421 within the image 411(i) which satisfies the sematic meaning of the query "a boy riding a bike". For example, as shown in FIG. 5, location parameters may include four coordinate values (x1''''y1''''), (x2'''', y2''''), (x3'''', y3''''), and (x4'''', y4'''') that correspond to four corners of a bounding box 421(5) for an object (e.g., "boy") in an identified second dataset entry (e.g., index 418(i)), and four coordinate values (x1'' y1''), (x2'', y2''), (x3'', y3''), and (x4'', y4'') that correspond to four corners of a bounding box 421(2) for an object (e.g., "bike") in the identified second dataset entry (e.g., index 418(i)). After the bounding boxes 421(5) and 421(2) that are included in the identified second dataset entry are identified (e.g., based on the respective coordinate values in the location parameters 434), the bounding boxes 421(5) and 421(2) are combined to generate a union box 503 in accordance with coordinate values of the respective bounding boxes 421. Then the image 411(i) may be cropped around the union box 503, and a cropped image 504 is generated and provided as the search output. In this example, the cropped image 504 may be generated to crop the image 411(i) along the boundary of the union box 503. Thus, a perimeter of the cropped image 504 may be irregular.

In some examples, cropping the image 411(i) may take aesthetic evaluation into consideration. In that case, one or more aesthetic rules may be applied to the selected image 411 to determine corresponding aesthetic regions of the image 411. An adjusted cropped image 505 may be generated in accordance with the corresponding aesthetic regions. The aesthetic rules may, for example, include rules based on the rule of thirds, guiding lines, color balance, dominant diagonal, or other aesthetic considerations. For example, an aesthetic rule may require two dominant diagonals of the adjusted cropped image 505 to be equal. Thus, the adjusted cropped image 505 having two equal dominant diagonals may be produced, based on the aesthetic rule and the union box 503. This is only illustrative and not intended to be limiting. In other applications, the aesthetic rules may be generated by a using a machine-learning module which improves aesthetic quality of the generated cropped image 505.

As shown in FIG. 5, the search result (either the cropped image 504 or the adjusted cropped image 505) includes an object pair and relationship which satisfy the sematic meaning of the query 501 "a boy is riding a bike". In some applications, the cropped image 504 and/or 505 may be output and returned to the ED 102, and displayed on the UI of the ED 102 for the ED user to review. In other examples, the cropped image 504 and/or 505 may be sent by the server 150 to the ED 102 to be displayed by the ED 102. In other applications, the cropped images 504 and/or 505 may be used as an input for different applications, such as image editing applications (e.g., collage creation) or social network applications (e.g., Facebook®, Instagram®, and etc.) among other options, which may be based on the ED user's 160 actions.

Figure 6:
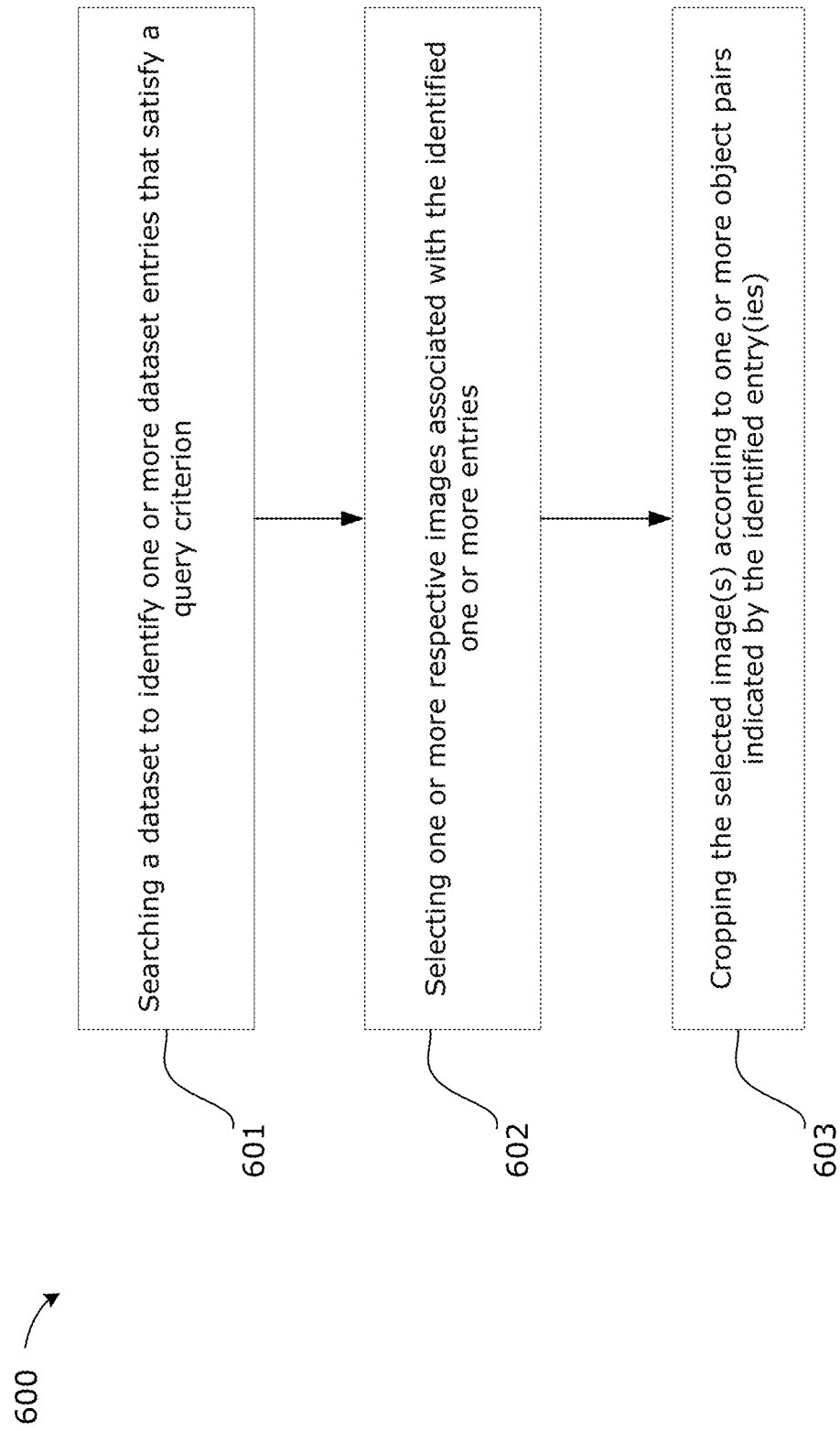
FIG. 6 is a flowchart of an example method for processing at least one image in accordance with a further example embodiment of the present disclosure.

FIG. 6 is a flowchart of an example method 600 for processing an image, which may be implemented in an example scenario as discussed with reference to FIG. 5. The method 600 may be performed at the server 150, for example, after receiving a query sent by the ED 102.

The method 600 begins when a query criterion is received (e.g., the server 150 receives the query from the ED 102 and parses the query to extract the query criterion). At step 601, a dataset is searched to identify a dataset entry that satisfies the query criterion. The dataset includes one or more dataset entries associated with a respective image, such as the first dataset 417 as discussed above. For example, the first dataset 417 may be searched to identify a dataset entry (e.g., referenced by the index 418) that satisfies a query criterion when a query (e.g., the query 501) is received. Details of the first dataset 417, and identification of the dataset entry has been discussed above and will not be repeated here.

At step 602, the image associated with the identified dataset entry is selected. For example, as presented in FIG. 5, an example image 411(i) may be associated with an identified dataset entry that satisfies the query 501. The image 411(i) is then selected.

At step 603, the selected image is cropped according to the object pairs indicated by the identified dataset entry. For example, as shown in FIG. 5, an identified dataset entry indicates an object pair including "boy" and "bike". The selected image 411(i) may be cropped to include the objects labeled as "boy" and "bike". Examples of how cropping may be performed (e.g., produce a cropped image 504 or 505) are discussed above.

For ease of understanding, the method 600 has been described with respect to a search that identifies a dataset entry, selects the associated image outputs a cropped image. However it should be understood that the search may identify multiple dataset entries that satisfy the query criterion. Accordingly, more than one image (i.e., all the images associated with the identified dataset entries) may be selected. For each identified dataset entry, the associated image is selected and cropped in accordance with the object pair of that dataset entry. The output may thus be more than one cropped image. Such a method to search and crop images may help to return search results in response to a search query more accurately by searching dataset entries from a dataset providing information about object pairs. Moreover, cropped images can be generated with little or no manual input, which may enable the cropped images to be output more efficiently.

Referring to FIG. 2 again, as discussed above, the first dataset 417 and the second dataset 440 may be stored within the one or more storage units 208. In some examples, the first dataset 417 may contain dataset entries associated with two or more different images. In some examples, instead of storing dataset entries comprising triplets in a first dataset 417 and dataset entries comprising location parameters 434 in a separate second dataset 440, dataset entries that include the index 418, image information, a triplet representing a relationship of an object pair, bounding box information, and location parameters 434 of bounding boxes may be stored together in a single dataset.

It should be also understood that although components in the scene graph generator 413 may be included at one single entity that is implemented by the system 200 in this example, in other examples, the components may be implemented in different entities of the communication system 100 shown in FIG. 1. Similarly, modules in the dataset generator 419 may be included at one single entity that is implemented by the system 200 or may be implemented in different entities of the communication system 100 shown in FIG. 1, in accordance with any suitable configurations.

As discussed above, an ED 102 and a server 150 in the communication system 100 may each include a respective processing system 200. In an example operation, the ED 102 may receive a query (e.g., "a boy riding a bike") that may be input by a user via the input device(s) 214. The ED 102 may then communicate the query to the server 150 (e.g., through the network 130, the cellular network 192, the satellite network, and/or the WLAN 190) using the network interface 206. After the server 150 receives the query, the processing device 205 of the server 150 may search a first dataset 417 (which may be local to the server 150 or external to the server 150). Dataset entries in the first dataset 417 which satisfy the sematic meaning of the query may be identified by the server 150 (e.g., by identifying the indices 418 of the dataset entries that satisfy the query). In other examples, the identification of the dataset entries may be a task or request sent by the server 150 to be performed by other components in the communication system 100.

After dataset entries have been identified, the server 150 may further search the second dataset 440, using the identified indices 418 from the first dataset 417, to obtain second dataset entries that include bounding box information and location parameters 434 that may be used to crop the associated images according to the search query. The server 150 may then return the cropped image to the ED 102 (e.g., via the network 130, the cellular network 192, the satellite network, and/or the WLAN 190) using the network interface 206 of the server 150. The cropped image may be then displayed at the output device(s) 216 of the ED 102, for the ED user 160's review. In some examples, the query (e.g., a boy riding a bike) may be a text input via a UI navigation device provided by the ED 102. In other examples, the query may be a voice input or any other suitable input. Although the query is received via the UI navigation device in this example, in other examples, the query may be received by other methods, such as being received via an online interface.

The present disclosure provides examples in which a scene graph for at least one or more salient portions of an image may be generated to represent one or more object pairs and one or more relationships between each object pair in the image. The scene graph may be generated only for salient portions of the image, which may help to reduce the number of objects of the scene graph and reduce the computation complexity of generating the scene graph. Information associated with different images may be stored within a dataset, which may be used to process and edit different images (e.g., from an album offline or from an image repository online) to satisfy a sematic meaning of a query.

In some examples, a region proposal network may be employed to generate the scene graph, which may help to improve effectiveness of object detection and relationship extraction. In some examples, a categorical clustering method may be used to help improve structural coherence of the scene graph.

In some applications, the generated dataset may be searched to identify one or more dataset entries that satisfy a query criterion (e.g., a criterion including the sematic meaning of a query). One or more images associated with the identified dataset entries are selected. Such a method may enable images to be selected more accurately to match the sematic meaning of the query.

In some examples, the selected image may be cropped by combining bounding boxes associated with the objects identified based on the sematic meaning of the query. The cropped image may be output (e.g., to be returned and displayed on the ED for the ED user to review). In some examples, the cropped image may be used as an input to other applications (e.g., collage creation or social network applications).

Examples of the present disclosure have been described in the context of implementation in an ED. It should be understood that the disclosed methods and systems may be implemented outside of ED. For example, the disclosed methods may be implemented as software in any suitable processing unit, such as a computing device, a workstation, an autonomous vehicle or non-vehicular device.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A method for processing an image to generate a scene graph, the method comprising:
receiving an image;
generating a saliency map from the image, wherein the saliency map indicates one or more salient portions of the image that have saliency values satisfying a saliency criterion;
generating a scene graph for at least the one or more salient portions of the image, the scene graph comprising a plurality of nodes representing a respective plurality of objects detected in the image, one or more object pairs being formed by the plurality of objects, and the scene graph further comprising one or more connectors representing respective one or more relationships between each respective object pairs;
generating one or more dataset entries associated with the image, wherein each of the one or more relationships for each of the one or more object pairs is indicated by a respective dataset entry, the respective dataset entry including a data triplet comprising labels for each object in the respective object pair and a label for a respective predicate indicating the respective relationship between the respective object pair; and
storing the one or more dataset entries in a first dataset.

2. The method of claim 1, wherein:
the one or more dataset entries stored in the first dataset include dataset entries associated with different respective images.

3. The method of claim 2, wherein the method further comprises:
searching the first dataset to identify a dataset entry that satisfies a query criterion;
selecting the image associated with the identified dataset entry;
cropping the selected image according to the object pair indicated by the identified dataset entry by:
identifying, using the identified dataset entry, a bounding box for each object in the object pair indicated by the identified dataset entry;
defining a union box by combining the respective bounding boxes; and
cropping the selected image around the defined union box; and
outputting the cropped image.

4. The method of claim 3, wherein the cropping further comprises:
prior to outputting the cropped image, applying one or more aesthetic rules to the cropped image to determine corresponding aesthetic regions of the cropped image; and
further adjusting the cropped image according to the determined corresponding aesthetic regions.

5. The method of claim 1, wherein generating the scene graph comprises:
defining the plurality of nodes of the scene graph by detecting the plurality of objects within the image and defining each node of the scene graph corresponding to a respective detected object within the image;
identifying the one or more object pairs formed by the detected objects; and
defining the one or more connectors of the scene graph by performing relationship extraction between each respective object pair within the salient portions of the image indicated by the saliency map to extract the respective relationship, and defining each connector, corresponding to each respective relationship, between each respective pair of nodes corresponding to each respective object pair.

6. The method of claim 5, wherein detecting the plurality of objects further comprises:
performing object localization for each detected object to generate a bounding box of the detected object;
for each respective bounding box:
generating corresponding location parameters of the respective bounding box; and
storing an identifier of the respective bounding box and the location parameters in a second dataset.

7. The method of claim 6, wherein the method further comprising:
searching the first dataset to identify a dataset entry that satisfies a query criterion;
searching the second dataset to identify location parameters that correspond to respective bounding boxes of the respective objects identified in the object pair in the one or more dataset entry;
cropping the image according to the identified location parameters by:
combining the respective bounding boxes to define a union box; and
cropping the image around the union box; and
outputting the cropped image.

8. The method of claim 1, wherein generating the scene graph comprises:
generating one or more proposed regions of the image using a region proposal network (RPN);
defining the plurality of nodes of the scene graph by detecting the plurality of objects in the one or more proposed regions and defining each node of the scene graph corresponding to a respective detected object within the one or more proposed regions;
identifying the one or more object pairs formed by the detected objects; and
defining the one or more connectors of the scene graph by performing relationship extraction between each respective object pair within the salient portions of the image indicated by the saliency map to extract the respective relationship, and defining each connector, corresponding to each respective relationship, between each respective pair of nodes corresponding to each respective object pair.

9. A method comprising:
receiving a query criterion;
searching a first dataset comprising one or more dataset entries, to identify a dataset entry that satisfies the query criterion, the identified dataset entry being associated with an image, the identified dataset entry including a data triplet comprising labels for each object in an object pair formed by a pair of objects detected in the image, the data triplet also comprising a label for a predicate indicating a relationship between the objects in the object pair, the objects and the relationship being represented by a scene graph;
selecting the image associated with the identified dataset entry;
cropping the selected image according to the object pair indicated by the identified dataset entry; and
outputting the cropped image.

10. The method of claim 9, wherein the cropping including:
prior to outputting the cropped image, applying one or more aesthetic rules to the cropped image to determine corresponding aesthetic regions of the cropped image; and
further adjusting the cropped image according to the determined corresponding aesthetic regions.

11. The method of claim 9, wherein the method further comprises cropping the selected image by:
identifying, using the identified dataset entry, a bounding box for each object in the object pair indicated by the identified dataset entry;
defining a union box by combining the respective bounding boxes; and
cropping the selected image around the defined union box.

12. The method of claim 9, wherein the method further comprises:
receiving at least one image; and
the dataset is generated by:
for each received image, generating a saliency map for the received image, wherein the saliency map indicates one or more salient portions of the image that have saliency values satisfying a saliency criterion;
generating a respective scene graph for at least the one or more salient portions of the received image by:
defining a plurality of nodes of the scene graph by detecting a respective plurality of objects within the image and defining each node of the scene graph corresponding to a respective detected object within the image;
identifying one or more object pairs formed by the detected objects; and
defining one or more connectors of the scene graph by performing relationship extraction between each respective object pair within the salient portions of the image indicated by the saliency map to extract the respective relationship, and defining each connector, corresponding to the respective relationship, between each respective pair of nodes corresponding to each respective object pair;
generating the one or more dataset entries associated with the received image; and
storing the respective one or more dataset entries associated with the received image in the first dataset.

13. The method of claim 12, wherein for the received image, generating the scene graph further comprises:
generating one or more proposed regions of the image using a region proposal network (RPN);
wherein the plurality of objects is detected in the one or more proposed regions only.

14. The method of claim 12, wherein detecting the plurality of objects further comprises:
performing object localization for each detected object to generate a bounding box of the detected object;
for each bounding box, generating a corresponding location parameter of the respective bounding box; and
storing respective location parameters in a second dataset.

15. A system comprising:
a memory storing instructions; and
a processor coupled to the memory and configured to execute the instructions to:
generate a saliency map for an image, wherein the saliency map indicates one or more salient portions of the image that have saliency values satisfying a saliency criterion;
generating a scene graph for at least the one or more salient portions of the image, the scene graph comprising a plurality of nodes representing a respective plurality of objects detected in the image, one or more object pairs being formed by the plurality of objects, and the scene graph further comprising one or more connectors representing respective one or more relationships between each respective object pairs;
generate one or more dataset entries associated with the image, wherein each of the one or more relationships for each of the one or more object pairs is indicated by a respective dataset entry, the respective dataset entry including a data triplet comprising labels for each object in the respective object pair and a label for a respective predicate indicating the respective relationship between the respective object pair; and
store the one or more dataset entries in a first dataset.

16. The system of claim 15, wherein:
the one or more dataset entries stored in the first dataset include dataset entries associated with different respective images.

17. The system of claim 16, wherein the processor is further configured to execute the instructions to:
search the first dataset to identify a dataset entry that satisfies a query criterion;
select the image associated with the identified dataset entry;
crop the selected image according to the object pair indicated by the identified dataset entry by:
identifying, using the identified dataset entry, a bounding box for each object in the object pair indicated by the identified dataset entry;
defining a union box by combining the respective bounding boxes; and
cropping the selected image around the defined union box; and
output the cropped image.

18. A system for processing at least one image, comprising:
a memory storing instructions; and
a processor coupled to the memory and configured to execute the instructions to:
receive a query criterion;
search a dataset comprising one or more dataset entries, to identify a dataset entry that satisfies the query criterion, the identified dataset entry being associated with an image, the identified dataset entry including a data triplet comprising labels for each object in an object pair formed by a pair of objects detected in the image, the data triplet also comprising a label for a predicate indicating a relationship between the objects in the object pair, the objects and the relationship being represented by a scene graph;

select the image associated with the identified dataset entry;

crop the selected image according to the object pair indicated by the identified dataset entry; and output the cropped image.

19. The system of claim 18, wherein the processor is further configured to execute the instructions to perform the cropping by:

prior to outputting the cropped image, applying one or more aesthetic rules to the cropped image to determine corresponding aesthetic regions of the cropped image; and further adjusting the cropped image according to the determined corresponding aesthetic regions.

20. The system of claim 18, wherein the processor is further configured to execute the instructions to crop the selected image by:

identifying, using the identified dataset entry, a bounding box for each object in the object pair indicated by the identified dataset entry;

defining a union box by combining the respective bounding boxes; and cropping the selected image around the defined union box.

* * * * *